US010799755B2

(12) United States Patent
Cristofori et al.

(10) Patent No.: US 10,799,755 B2
(45) Date of Patent: Oct. 13, 2020

(54) GYMNASTIC APPARATUS FOR CYCLING SIMULATION AND OPERATING METHODS THEREOF

(71) Applicant: TECHNOGYM S.P.A., Cesena (IT)

(72) Inventors: Claudio Cristofori, Cesena (IT); Fabio Urbini, Cesena (IT); Daniele Giraldi, Cesena (IT); Alberto Faedi, Cesena (IT); Roberto Gorza, Cesena (IT)

(73) Assignee: TECHNOGYM S.P.A., Cesena—FC (IT)

( * ) Notice: Subject to any disclaimer, the term of this patent is extended or adjusted under 35 U.S.C. 154(b) by 245 days.

(21) Appl. No.: 15/668,519

(22) Filed: Aug. 3, 2017

(65) Prior Publication Data

US 2018/0036586 A1  Feb. 8, 2018

(30) Foreign Application Priority Data

Aug. 5, 2016  (IT) .......................... 102016000083062

(51) Int. Cl.
*A63B 22/06*  (2006.01)
*A63B 21/00*  (2006.01)
(Continued)

(52) U.S. Cl.
CPC ...... *A63B 22/0605* (2013.01); *A63B 21/0054* (2015.10); *A63B 21/0058* (2013.01);
(Continued)

(58) Field of Classification Search
CPC ............ A63B 22/0605; A63B 21/0058; A63B 22/0285; A63B 22/0087; A63B 71/0619;
(Continued)

(56) References Cited

U.S. PATENT DOCUMENTS 5,616,104 A    4/1997  Mulenburg et al.
6,450,922 B1 *  9/2002  Henderson ......... A63B 24/0006
                                                482/8
(Continued)

FOREIGN PATENT DOCUMENTS

AT           505 617 A4    3/2009
CN         101842138 A     9/2010
(Continued)

OTHER PUBLICATIONS

Italian Search Report and Written Opinion issued in IT201600083062 dated Apr. 21, 2017.
(Continued)

*Primary Examiner* — Andrew S Lo
(74) *Attorney, Agent, or Firm* — Arent Fox LLP

(57) ABSTRACT

Aspects of the present disclosure relate to a gymnastic apparatus and method for cycling simulation having a transmission portion driven by pedals, through which a user may perform cycling training. The transmission portion may comprise a flywheel and a braking portion, which may apply a braking force to the flywheel. The apparatus may further comprise a control logic unit, through which training parameters may be set, and a sensor coupled to the control logic unit. The sensor may detect a signal relating to the torque acting on the flywheel and thereby send a signal to the control logic unit; the control logic unit may be configured to adjust the braking force of the braking portion applied to the flywheel, thereby adjusting the resistance to the pedals as a function of parameters set, as appropriate, and communicate information and adjust such changes via a feedback signal from the sensor.

19 Claims, 15 Drawing Sheets

(51) Int. Cl.

| | |
|---|---|
| *A63B 21/005* | (2006.01) |
| *A63B 23/04* | (2006.01) |
| *A63B 22/00* | (2006.01) |
| *A63B 21/22* | (2006.01) |
| *A63B 24/00* | (2006.01) |
| *A63B 22/02* | (2006.01) |
| *A63B 71/06* | (2006.01) |
| *F16H 61/02* | (2006.01) |
| *B62M 11/14* | (2006.01) |
| *B62M 25/04* | (2006.01) |
| *B62K 23/06* | (2006.01) |

(52) U.S. Cl.
CPC .. *A63B 21/00076* (2013.01); *A63B 21/00192* (2013.01); *A63B 21/225* (2013.01); *A63B 22/0025* (2015.10); *A63B 22/0087* (2013.01); *A63B 22/0285* (2013.01); *A63B 23/0476* (2013.01); *A63B 71/0619* (2013.01); *F16H 61/02* (2013.01); *A63B 2022/0033* (2013.01); *A63B 2022/0611* (2013.01); *A63B 2024/0093* (2013.01); *A63B 2071/0675* (2013.01); *A63B 2208/0233* (2013.01); *A63B 2220/34* (2013.01); *A63B 2220/54* (2013.01); *A63B 2220/833* (2013.01); *B62K 23/06* (2013.01); *B62M 11/145* (2013.01); *B62M 25/04* (2013.01)

(58) Field of Classification Search
CPC .............. A63B 21/225; A63B 21/0054; A63B 21/00076; A63B 21/00192; A63B 23/0476; A63B 22/0025; A63B 2208/0233; A63B 2024/0093; A63B 2071/0675; A63B 2022/0611; A63B 2220/34; A63B 2220/54; A63B 2022/0033; A63B 2220/833; F16H 61/02; B62M 11/145; B62M 25/04; B62K 23/06
See application file for complete search history.

(56) References Cited

U.S. PATENT DOCUMENTS

| | | | | |
|---|---|---|---|---|
| 6,902,513 | B1* | 6/2005 | McClure | A63B 24/0006 482/4 |
| 7,651,423 | B2* | 1/2010 | Ichida | B62K 23/06 188/15 |
| 2006/0003872 | A1* | 1/2006 | Chiles | A63B 21/225 482/57 |
| 2006/0234840 | A1* | 10/2006 | Watson | A63B 24/00 482/61 |
| 2008/0103030 | A1* | 5/2008 | Watson | A63B 24/00 482/61 |
| 2008/0207402 | A1* | 8/2008 | Fisher | A63B 21/0051 482/5 |
| 2009/0118099 | A1* | 5/2009 | Fisher | A63B 21/0052 482/5 |
| 2009/0217780 | A1 | 9/2009 | Evett | |
| 2010/0113223 | A1* | 5/2010 | Chiles | A63B 21/225 482/5 |
| 2011/0118086 | A1* | 5/2011 | Radow | A63B 21/00196 482/5 |
| 2012/0238406 | A1* | 9/2012 | Beard | A63B 21/0053 482/2 |
| 2013/0059698 | A1* | 3/2013 | Barton | A63B 71/0622 482/63 |
| 2014/0224055 | A1* | 8/2014 | Cracco | B62M 25/08 74/473.12 |
| 2014/0361511 | A1* | 12/2014 | Thompson | B62M 1/30 280/262 |
| 2014/0378280 | A1* | 12/2014 | Kristiansen | A63B 22/0046 482/61 |
| 2015/0080190 | A1* | 3/2015 | Kaan | A63B 69/16 482/57 |
| 2015/0344103 | A1* | 12/2015 | Kuroda | B62M 25/04 701/56 |
| 2015/0344104 | A1* | 12/2015 | Kuroda | B62M 25/04 701/52 |
| 2016/0236751 | A1* | 8/2016 | Rosen | B62M 25/08 |
| 2016/0311483 | A1* | 10/2016 | Laronde | B62H 1/06 |
| 2017/0334518 | A1* | 11/2017 | Bortoli | B62M 9/132 |
| 2018/0001142 | A1* | 1/2018 | Viarani | A63B 21/4034 |
| 2018/0036586 | A1* | 2/2018 | Cristofori | A63B 22/0025 |

FOREIGN PATENT DOCUMENTS

| | | |
|---|---|---|
| CN | 102893063 A | 1/2013 |
| EP | 2 564 904 A1 | 3/2003 |
| EP | 2 949 367 A1 | 12/2015 |
| WO | WO 92/20408 A1 | 11/1992 |
| WO | WO 2008/002644 A2 | 1/2008 |

OTHER PUBLICATIONS

Chinese Office Action (with Full English Translation) dated Jan. 21, 2019 issued in Chinese Patent Application No. 201710662848.4.

\* cited by examiner

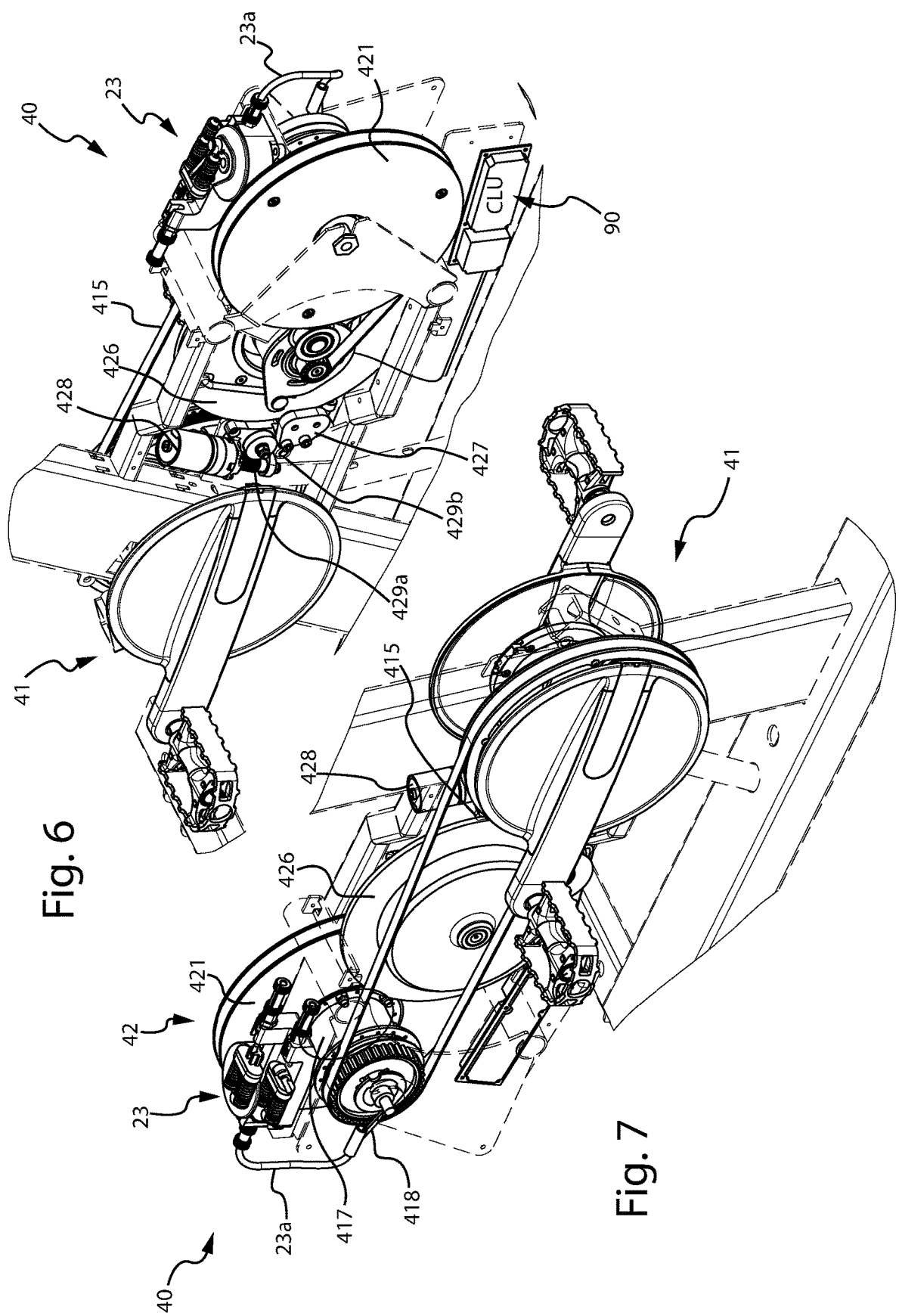

GYMNASTIC APPARATUS FOR CYCLING SIMULATION AND OPERATING METHODS THEREOF

CROSS-REFERENCE TO RELATED APPLICATION

This application claims the benefit of priority to Italian Patent Application No. 102016000083062, filed Aug. 5, 2016. The disclosure of the priority application is hereby incorporated in its entirety by reference.

FIELD OF THE INVENTION

Aspects of the present disclosure relate to a gymnastic apparatus for cycling simulation and method of operation thereof, and more specifically, for example, to a gymnastic apparatus implemented particularly to carry out cycling training in closed spaces, such as gyms, domestic environments and the like, and which may be used for any suitable training needed by a cyclist for maintaining physical condition, for example during winter periods, and also for improving physical preparation using specific exercises achievable with such gymnastic apparatus.

BACKGROUND OF THE TECHNOLOGY

In gyms and home environments, exercise training may be achieved using training equipment, such as spinning bikes or stationary bikes intended to simulate cycling training.

However, many of the abovementioned apparatuses do not accurately simulate the training provided by riding a standard bicycle outdoors, as they are provided only with a single transmission ratio (e.g., gear ratio); therefore, the rotational speed of the flywheel, and hence the rotational inertia of the pedals during training depends directly on the pedaling cadence.

In particular, the flywheel in the abovementioned apparatuses has a rotational speed directly proportional to the pedaling cadence, which is generally not characteristic of a standard bicycle.

Since gymnastic equipment for the simulation of a realistic riding experience is spreading, some apparatuses are equipped with manual systems for the adjustment of the cadence and the resistance of the flywheel. However, this adjustment is often ineffective and unreliable.

In light of the above, there remains an unmet need in the art to provide a cycling simulation gymnastic apparatus that enables quick and accurate adjustment of the pedaling cadence and resistance provided, so as to better simulate a realistic riding experience.

SUMMARY

Aspect of the present disclosure relate to gymnastic apparatuses for cycling simulation.

Additional aspects of the present disclosure relates to operating methods for gymnastic apparatuses.

It is therefore specific object of the present invention an apparatus for cycling simulation comprising: a support frame; a transmission portion rotatably driven by pedals and installed on said support frame, the transmission portion comprising: a transmission assembly, for the transmission of the motion from said pedals; and a braking assembly, comprising a flywheel, rotating about a flywheel shaft operated by said transmission assembly, said braking assembly being arranged for braking said flywheel; said apparatus further comprising: a control logic unit, wherein cycling training parameters are stored or are settable by a user; and a sensor connected to said control logic unit, said sensor being capable of detecting a feedback signal related to the torque acting on said flywheel shaft during the rotation of said flywheel and of sending said signal to said control logic unit; said control logic unit being configured so as to allow the adjustment of the braking force exerted by said braking assembly on said flywheel by adjusting the resistance to the rotation of said transmission portion when a force is applied to said pedals based on said parameters and on the feedback signal received from said sensor.

Always according to the invention, said motion transmission assembly could comprise a gearshift for the selection of a gear ratio, for adjusting the resistance to the rotation of said transmission portion.

Still according to the invention, said gearshift could comprise gear wheels, coupled to each other by epicyclical gearing.

Further according to the invention, said motion transmission assembly could comprise a main shaft, cranks to which said pedals are coupled, said cranks being coupled with said main shaft, a crown keyed on said main shaft, a first pulley, a secondary shaft, to which said first pulley is keyed, and a first force transmitting portion engaged with said crown and with said first pulley.

Preferably according to the invention, said gearshift for the selection of a gear ratio is mechanically coupled with said secondary shaft.

Always according to the invention, said apparatus could comprise: a transmission ratio selecting device mechanically coupled with said gearshift; a handlebar fixed to said support frame of the apparatus, comprising a first handle and a second handle arranged thereon, and a first lever, fixed on said first handle and connected to said first cable, and a second lever fixed on said second handle and connected to said second cable, said first and second lever being pivotally operable; a first cable extending from said first lever to said transmission ratio selecting device, for operating said gearshift; and a second cable extending from said second lever to said transmission ratio selecting device, for operating said gearshift.

Still according to the invention, said transmission ratio selecting device could be connected to said gearshift by a selecting cable, said transmission ratio selecting device could comprises: a gear reducer assembly mechanically connected to said cable; a gear increase assembly mechanically connected to said cable; and a snap operable mechanism, which said selecting cable is coupled to, said snap operable mechanism being operable by said gear reducer assembly and said gear increase assembly, such that: when said first lever first lever is operated and said first cable is pulled, said gear reducer assembly operates said snap operable mechanism, so as to release said selecting cable of a stretch; and when said second lever first lever is operated and said second cable is pulled, said gear increase assembly operates said snap operable mechanism, so as to pull said selecting cable of a stretch.

Always according to the invention, said snap operable mechanism could comprise a first and a second ratchet wheels keyed each other, one end of said selecting cable being fixed to said first and a second ratchet wheels, said first and second ratchet wheels being arranged so as to rotate in a gear reducing direction, in which the selecting cable is released, and in a gear increase direction, opposite to said gear reducing direction, in which the selecting cable is pulled; and an unlocking pawl member, having a lever and a pawl, said pawl of said unlocking pawl member being kept engaged with a tooth of the second ratchet wheel by a spring; and said transmission ratio selecting device could comprise: a containment casing having a housing within which first and a second ratchet wheels are arranged and where a cam shaped surface is obtained, said unlocking pawl member being pivoted about said containment casing; said gear reducer assembly comprises a reducing slider, provided with return springs and a reducer pawl member, operable by said reducing slider and having a pawl arranged so as to engage, when operated, said lever of said unlocking pawl member, said reducer pawl member being pivoted about said containment casing, fixed to said containment casing and provided with a return spring, for returning said reducer pawl member in the initial position, after the operation by said reducing slider; and said gear increase assembly comprising a rotating plate, pivoted about said containment casing, an increase slider, provided with return springs and said increase slider being also rotatably coupled with said rotating plate in a point placed eccentric with respect to the pivot said rotating plate is pivoted about with respect to said containment casing, and an increase pawl member, pivoted about said rotating plate and provided with a return spring, said increase pawl member having a lever and a pawl and being arranged for engaging a tooth of said first ratchet wheel, so as to rotate the same toward said gear increase direction, so as to cause the pawl of said unlocking pawl member to slide over the second ratchet wheel and engage with a following tooth.

Further according to the invention, said apparatus could comprise an actuator, for the electronic activation of said gearshift, said actuator being connected to, and operated by said control logic unit.

Always according to the invention, said actuator could operate said transmission ratio selecting device.

Still according to the invention, said braking assembly could comprise at least one permanent magnet, a magnet holder bracket housing said at least one permanent magnet, said magnet holder bracket being capable of assuming an inactive position, in which said at least one permanent magnet does not overlap over said flywheel, and an active position, in which said at least one permanent magnet is at least partially overlapped over said flywheel, and a motor, connected to, and controlled by said control logic unit, said motor being arranged for causing said magnet holder bracket to pass from said inactive position to an active position and vice-versa.

Further according to the invention, said braking assembly be of electromagnetic type comprising a coil and a clutch, actuated by said coil made of winding turns, where the adjustment of the braking action is achieved by adjusting the current flowing through said winding turns.

Preferably according to the invention, said sensor could be a torque sensor for detecting the torque acting on said flywheel shaft during the rotation of said flywheel, and/or for detecting the rotation speed of said flywheel, and/or for detecting the pedaling cadence of said user by means of said pedals.

Always according to the invention, said cycling training parameters could comprise power of the workout and/or the slope to be simulated by the workout.

It is further object of the present invention an operating method for a cycling simulation apparatus as described above, characterized in that it comprises a constant power training mode and a constant slope training mode.

Still according to the invention, said constant power training mode could comprise: a main selecting step (A), where, by said interface device can be selected whether to carry out the workout following one of the available programs or to carry out a workout selecting manually one of the power levels of the workout; a program selecting step (B), in case of in said step (A) were selected to carry out the workout following one of the available programs, where the workout program among the ones available is selectable; a workout control procedure (C), comprising the substeps of (C1) running the power level of the workout among the possible set of the selectable power levels of the workout; (C2) checking the cadence, showing it the user, by means of said sensor; (C3) adjusting the torque in order to maintain the selected power level of the workout; a power level selecting step (E), in case of the user in said step (A) selected to carry out to the workout selecting the power level of the workout; and a workout control procedure step (F), comprising the substeps of (F1) checking the cadence, showing it the user, by means of said sensor; (F2) adjusting the torque in order to maintain the present power value.

Always according to the invention, said method could comprise: after said control procedure step (C), a manual power level change step (D), where the user can change the power level of the workout among the possible set of power levels of the workout, such that, in case of the power level of the workout is changed, the procedure comes back to the workout control procedure (C), otherwise the workout ends; and/or after said workout control procedure step (F), a manual level of power level of the workout change step (G), where the user can change the power level of the workout among the possible set of power levels of the workout, such that, in case of the power level of the workout is changed, the procedure comes back to the workout control procedure (C), otherwise the workout ends.

Still according to the invention, said constant slope training mode could comprise: a main selecting step (H), where, by an interface device, it can be selected whether to carry out the workout following one of the available programs by the interface device or to carry out a workout selecting manually one of the simulating slope values; and a program selecting step (I), in case of in said step (H) were selected to carry out the workout following one of the available programs, where the workout program among the ones available is selectable; a workout control procedure (L), comprising the substeps of (L1) running the simulating slope value among the possible set of levels of selectable simulating slope values; (L2) checking the cadence, showing it to the user, by means of said sensor; a checking step (M), where it is checked whether the user is able to carry out the suggested cadence, so that, in case of the user is not able to carry out the suggested cadence, said constant slope training mode comprises an adjustments step (N) of the cadence by said gearshift; otherwise a slope level manual change step (O) is provided, where the user can change the slope level of the workout among the possible set of slope levels, coming back to said workout control procedure (L); a level of slope selecting step (P), in case of the user in said step (H) selected to carry out to the workout selecting the slope level; a workout control procedure (Q), comprising the step of checking cadence, showing it to the user, by means of said sensor; a checking step (R), where it is checked whether the user is able to carry out the suggested cadence, so that, in case of the user is not able to carry out the suggested cadence, said constant slope training mode comprises an adjustments step (S) of the cadence by said gearshift; a slope level manual change step (T), where the user can change the slope level of the workout among the possible set of slope levels, such that, in case of the selected slope level is changed, the procedure comes back to the workout control procedure (Q), otherwise the workout ends.

Additional advantages and novel features of these aspects will be set forth in part in the description that follows, and in part will become more apparent to those skilled in the art upon examination of the following or upon learning by practice in accordance with aspects of the present disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations thereof.

FIG. 6 shows a perspective view of the layout of the gymnastic apparatus for cycling simulation in accordance with aspects of the present disclosure.

FIG. 7 shows a perspective seethrough view of the apparatus of FIG. 6.

DETAILED DESCRIPTION

In the various figures, similar parts may be indicated by the same reference numbers.

Figure 1:
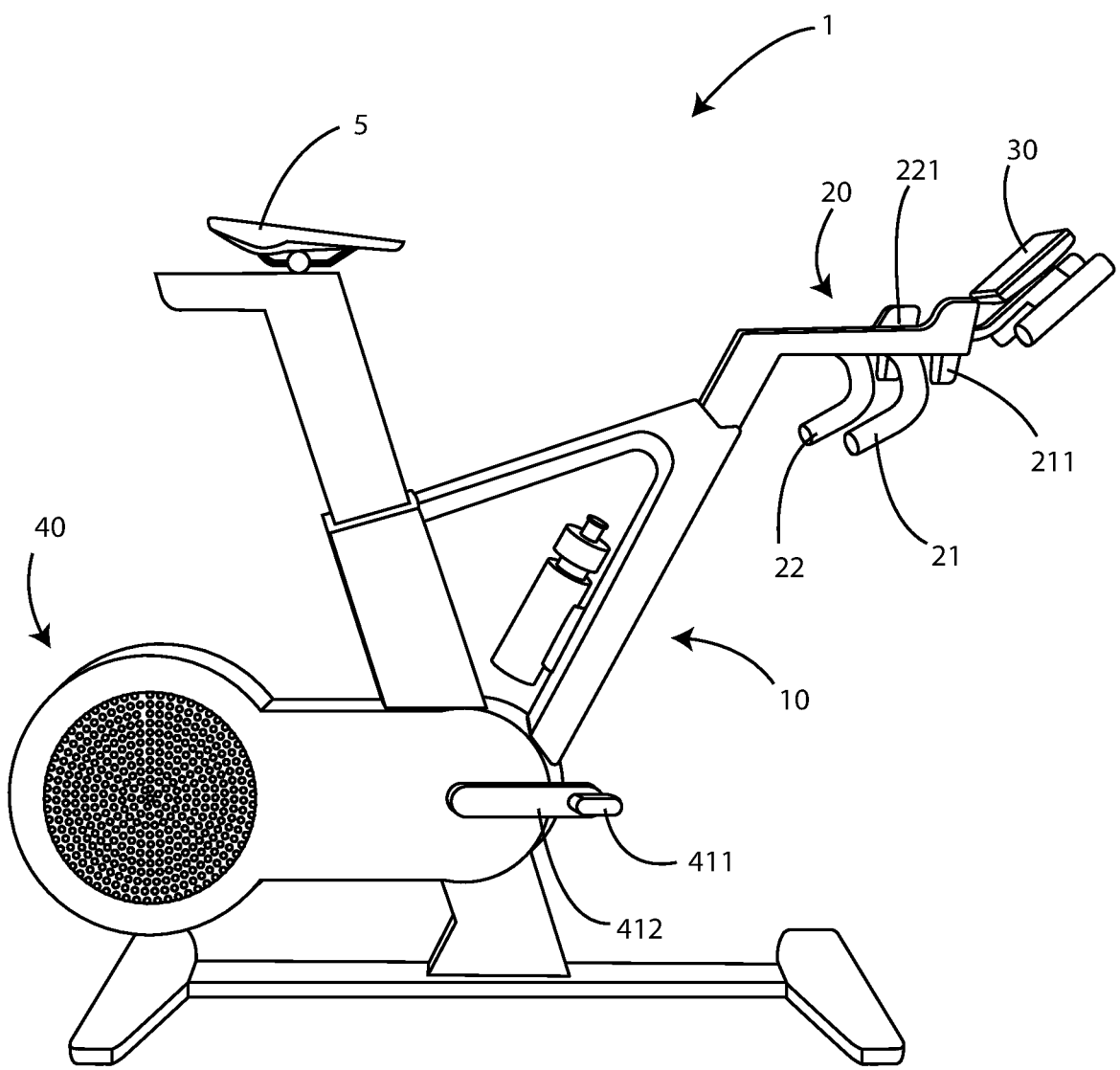
FIG. 1 shows a side view of an example gymnastic apparatus for cycling simulation in accordance with aspects of the present disclosure.

Referring to FIG. 1, the gymnastic apparatus 1 for the cycling simulation in accordance with aspects of the present disclosure may comprise a support frame 10, a handlebar 20 for the support of the upper limbs of a user when the apparatus 1 is in use, and an interface device 30 for the interaction between the user and the gymnastic apparatus 1.

The apparatus 1 may further include a transmission portion 40, a control logic unit 90 (see the control logic unit or CLU 90 shown in FIGS. 13 and 14, elements and other features of which may further make up or be part of a computer system and/or terminal as further shown and described with respect to FIGS. 15 and 16 below), and a seat 5 for the user.

The handlebar 20 may further include a first handle 21, and a second handle 22, arranged on opposite ends of the handlebar 20. The abovementioned first handle 21 may be grasped by the user's right hand and the second handle 22 may be grasped by the user's left hand, for example, when a user is seated on the apparatus 1 as shown in FIG. 1.

A first lever 211 may be fixedly attached or held to the first handle 21, and a second lever 221 may be fixedly held or attached on the second handle 22. Such fixed holding or attachment may include, for example, straps, bolts, adhesives, welding, or other attachment features or methods.

Figure 2:
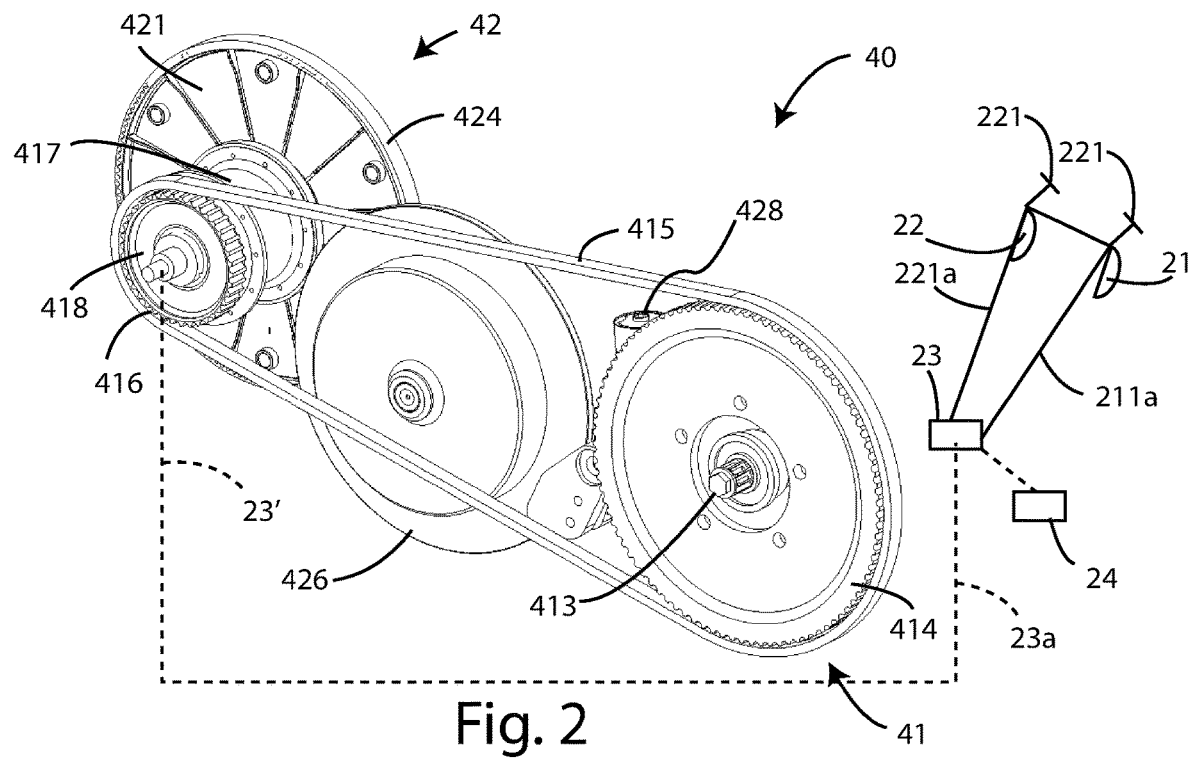
FIG. 2 shows a perspective seethrough view of an example functional assembly of the apparatus of FIG. 1.
Figure 3:
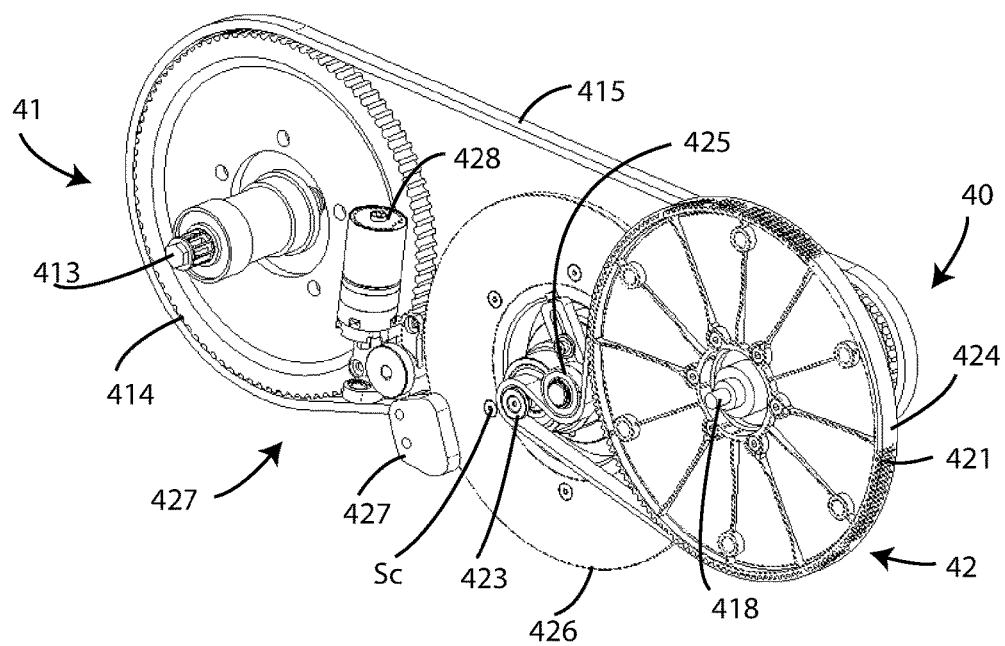
FIG. 3 shows a further perspective view of the functional assembly of FIG. 2.

Referring now to FIG. 2, the first lever 211 and second lever 221 may be connected to a respective cable 211a and 221a. The cables 211a, 221a may be connected to or otherwise coupled to a transmission ratio selecting device 23, the details and function of which are discussed in further detail below.

Referring to FIGS. 2-5 and 6-7, the transmission portion 40 may comprise a motion transmission assembly 41 and a braking assembly 42.

Further, the motion transmission assembly 41 may comprise a main shaft 413, to which the cranks 412 (FIG. 1) that support pedals 411 (FIG. 1) and a crown 414, may be connected or coupled. The crown 414 may be keyed to the main shaft 413, for example.

The motion transmission assembly 41 may also include a first force transmission portion 415. The first force transmission portion 415 may be a belt or a chain, for example. The motion transmission assembly 41 may also include a first pulley 416, with which the first force transmission portion 415 is engaged. The first pulley 416 may further be keyed to a secondary shaft 418.

Furthermore, the motion transmission assembly 41 may include a gearshift 417, such as one or more gears and a gear ratio selector. The gearshift 417 may be mechanically or otherwise coupled to the secondary shaft 418.

The abovementioned gearshift 417 may include, for example, toothed wheels, which may interoperate with one another via, for example, epicyclical gearing. The epicyclical gearing may include an annulus gear (e.g., a ring gear). the annulus gear may be rotatable about and sharing an axis of rotation with a naseral gear (e.g., sun gear), for example. Further, the epicyclical gearing may include a single or plurality of planetary gears supported by a carrier. The sun gear may have teeth or other features that meshably operate with the teeth or other corresponding features of any of the abovementioned planetary gear(s). The planetary gear(s) may further meshably operate with teeth or other features of the annulus gear.

As shown in FIG. 2, the transmission ratio selecting device 23 may be connected with or otherwise operatively coupled to the gearshift 417, such as via a selecting cable 23a, so that a user may change the transmission ratio. For example, a user may move the first lever 211 and/or the second lever 221, to select different gear ratios. As an example, a user may select a higher gear, by activating (e.g., moving the position of) the first lever 211, and a lower gear, by activating the second lever 221.

In operation, receipt of input from the first 211 or second 221 lever via the cables 211a, 221a, respectively, may cause the transmission ratio selecting device 23 to provide an output so as to change the gear ratio as selected.

For example, when the respective cable 211a or 221a is moved or a signal is received therefrom, the transmission ratio selecting device 23 carries a click, which pulls, in its turn, the selecting cable 23a. The selecting cable 23a engages with the gearshift 417 and shifts the transmission ratio.

Figure 8A:
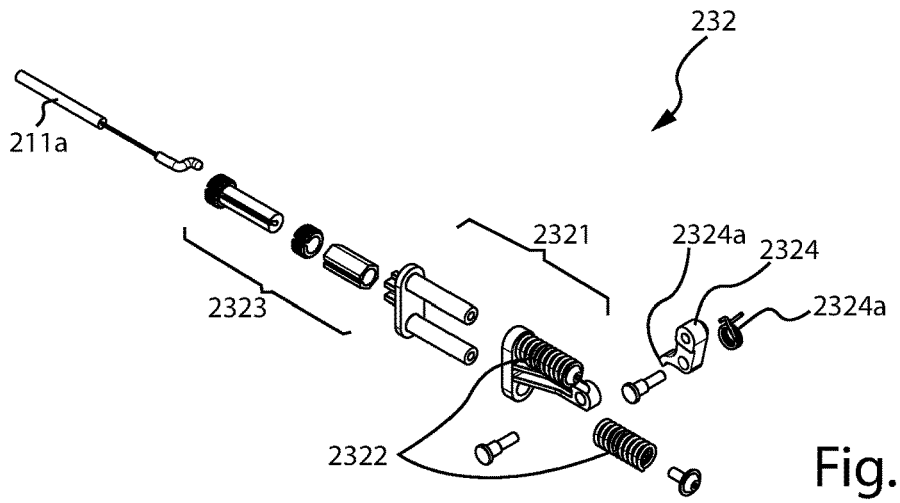
FIG. 8A shows an exploded view of a gear reducer assembly of the transmission ratio selecting device of FIG. 8.
Figure 8:
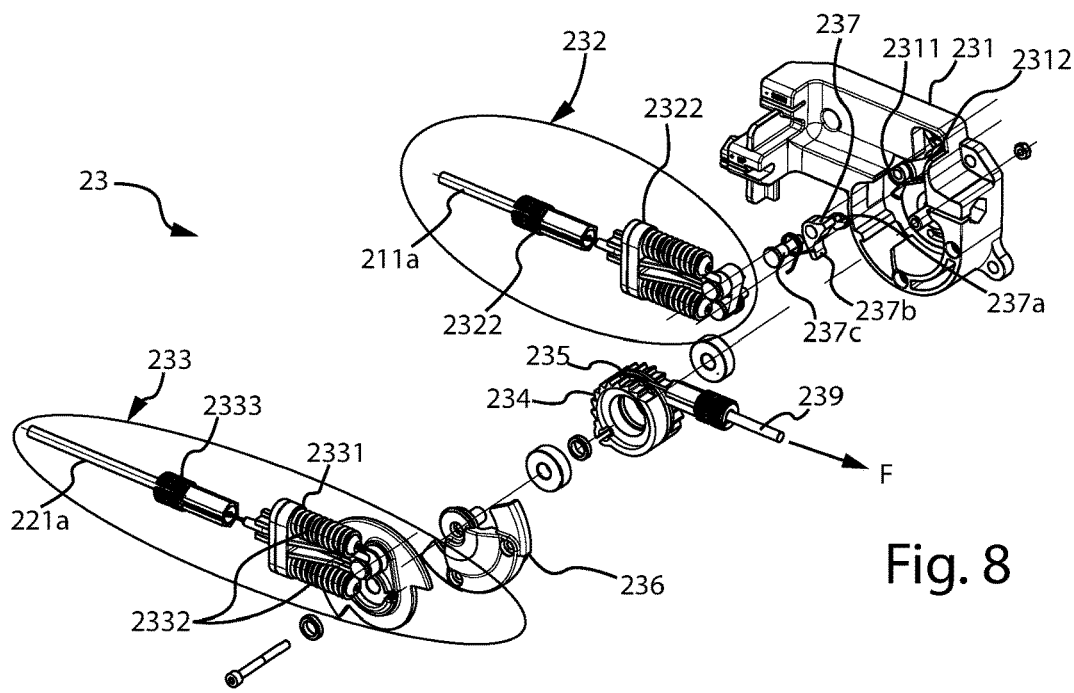
FIG. 8 shows an exploded view of a transmission ratio selecting device of the functional assembly of FIG. 2.
Figure 8B:
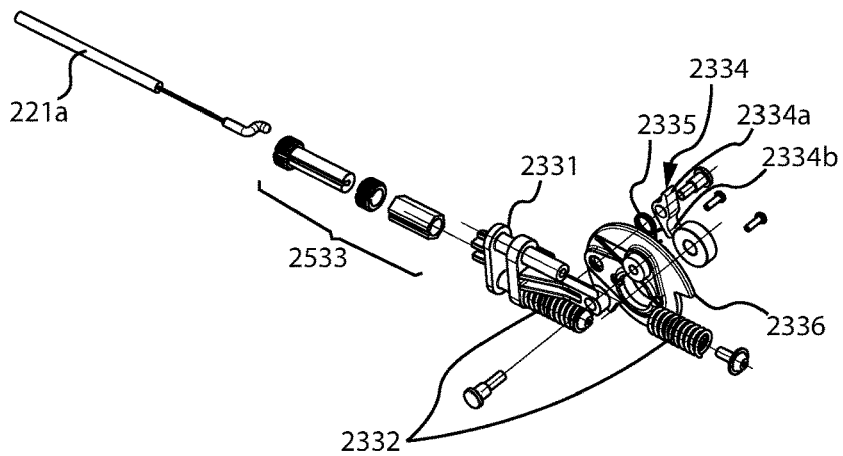
FIG. 8B shows an exploded view of a gear increase assembly of the transmission ratio selecting device of FIG. 8.

Referring to FIGS. 8, 8A and 8B the structure of a transmission ratio selecting device 23 is shown. It essentially comprises a containment casing 231, a gear reducer assembly 232, a gear increase assembly 233, a first 234 and a second 235 ratchet wheels, juxtaposed arranged and keyed each other, between which an end of the selecting cable 23a is fixed. Said first 234 and second 235 ratchet wheels are intended to rotate in a gear reducing direction, in which the selecting cable 23a is released, and a gear increase direction, opposite to said gear reducing direction, in which the selecting cable 23a is pulled.

The transmission ratio selecting device 23 also comprises a lid 236 and an unlocking pawl member 237, pivoted about the containment casing 231 and having a lever 237a and a pawl 237b, the latter engaged with a tooth of said second ratchet wheel 235.

The unlocking pawl member 237 and the first 234 and second 235 ratchet wheels form a snap operable mechanism.

Said containment casing 231 has a housing 2311, where said first 234 and a second 235 ratchet wheels are housed. On the internal surface of said housing 2311 a cam shaped surface 2312 is obtained, which operation will better described below.

Said gear reducer assembly 232 comprises a reducing slider 2321, provided with return springs 2322 and mechanically connected to said cable 211a, tension adjusting members 2323, arranged between said reducing slider 2321 and said cable 211a, for adjusting the tension of said cable 211a, and a reducer pawl member 2324, operable by said reducing slider 2321 and having a pawl 2324a, arranged so as to engage, when operated, said lever 237a of said unlocking pawl member 237.

Said reducer pawl member 2324 is pivoted about said containment casing 231, fixed to said containment casing 231 and provided with a return spring 2325, for returning said reducer pawl member 2324 in the initial position, after the operation by said reducing slider 2321.

Said gear increase assembly 233 comprises an increase slider 2331, provided with return springs 2332 and mechanically connected to said cable 211a, tension adjusting members 2333, arranged between said increase slider 2331 and said cable 221a, for adjusting the tension of said cable 221a, and a rotating plate 2335, pivoted about said containment casing 231.

Said increase slider 2331 is rotatably coupled with said rotating plate 2336 in a point placed eccentric with respect to the pivot, which said rotating plate 2336 is pivoted about with respect to said containment casing 231. The gear increase assembly 233 comprises also an increase pawl member 2334, having a lever 2334a and a pawl 2334b.

The increase pawl member 2334 is pivoted about said rotating plate 2335 and is also provided with a relevant return spring 2326. The pawl 2334b of the increase pawl member 2334 is arranged for engaging a tooth of said first ratchet wheel, so as to rotate the same toward said gear increase direction, causing the pawl 237b of said unlocking pawl member 237 to slide over the second ratchet wheel 235 and to engage with a subsequent tooth.

One end of the selecting cable 23a is fixed between said first 234 and a second 235 ratchet wheels, such that, when said first 234 and second 235 ratchet wheels rotate, in the reducing gear direction or in the increasing gear direction, the selecting cable 23a is released or pulled.

The pawl 237b of said unlocking pawl member 237 is kept engaged with a tooth of the second ratchet wheel 235 by a spring 323c.

In use, the selecting cable 23a is tensioned by the gearshift 417, according to a force oriented as the arrow F, as shown in FIG. 8.

Figure 9A:
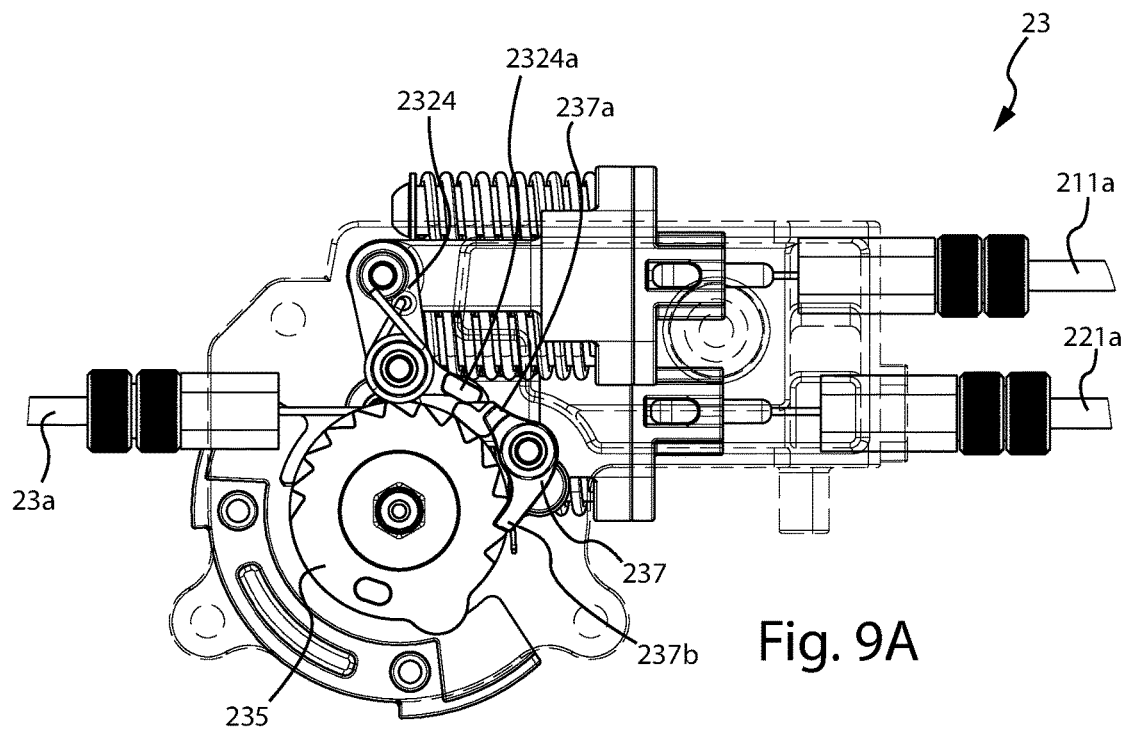
FIG. 9A shows a sideview of the transmission ratio selecting device in an initial state, before reducing a gear.
Figure 9B:
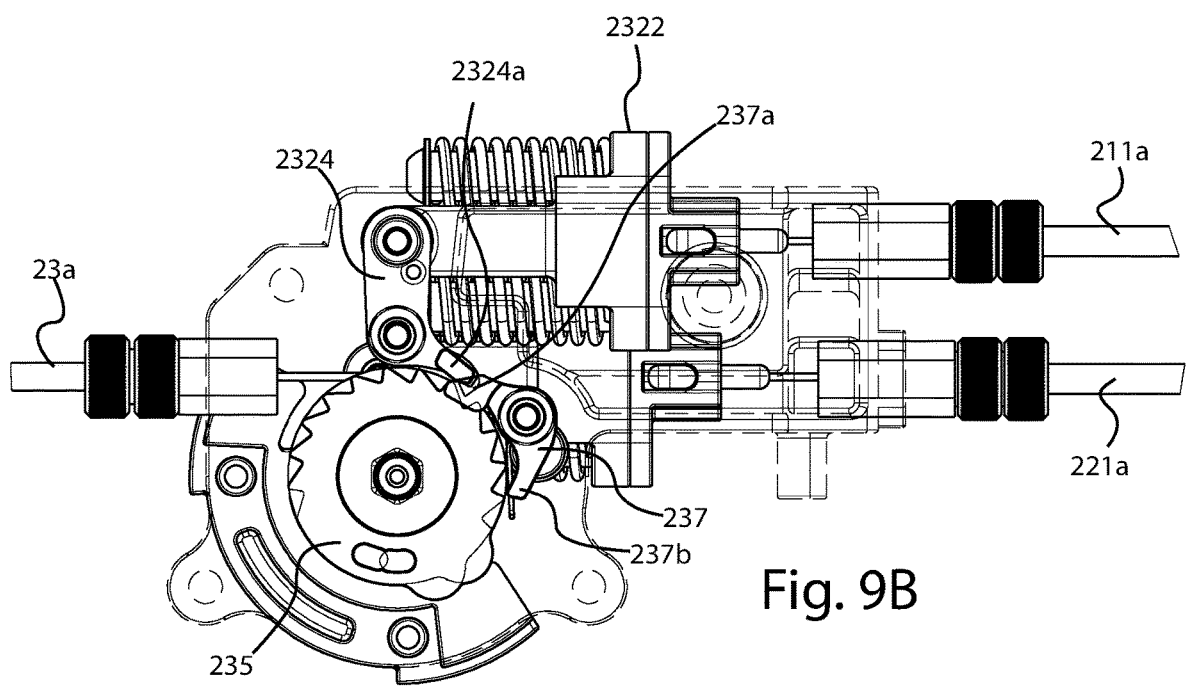
FIG. 9B shows a seethrough view of the transmission ratio selecting device in an intermediate state, while it is reducing the gear.
Figure 9C:
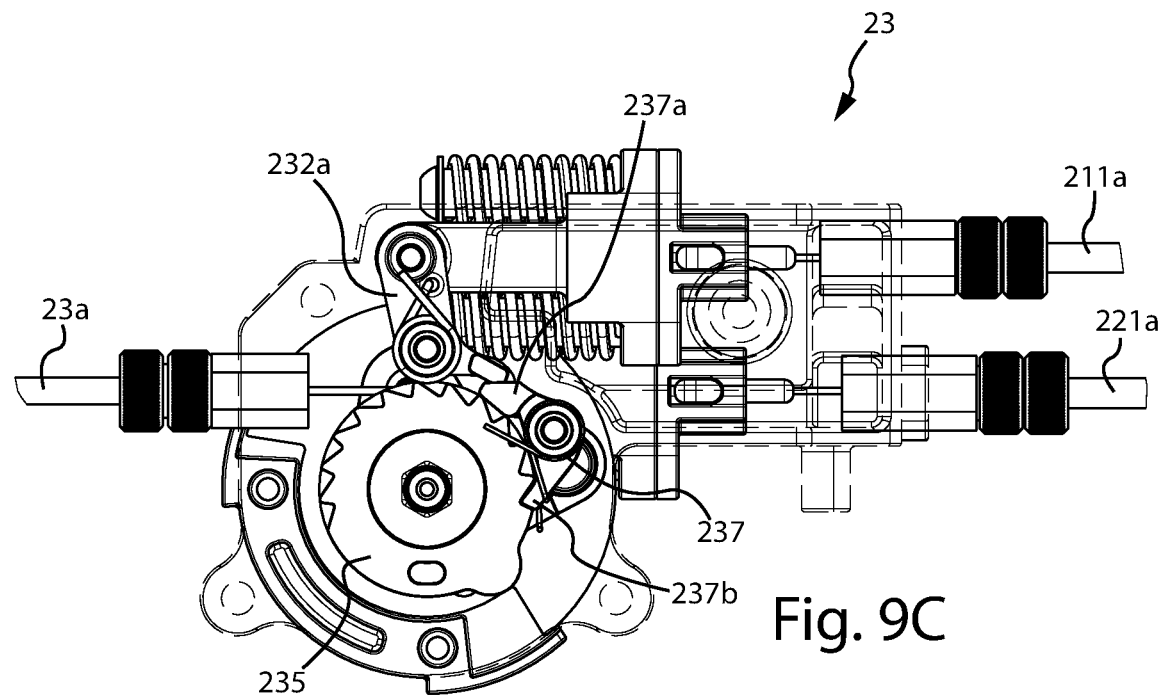
FIG. 9C shows a seethrough view of the transmission ratio selecting device in a final state, after the reduction of the gear.

Referring to FIGS. 9A-9C, the transmission ratio selecting device 23 is shown in several states for the gear reduction by acting on the handle 21. In particular, when the cable 211a is pulled by said handle 21 (FIG. 9A), the reducing slider 2321 is in its turn pulled, overcoming the resistance of the return springs 2322, thus causing the rotation of the reducer pawl member 2324 (FIG. 9B), so that the pawl 2324a engages the lever 237a of the unlocking pawl member 237, causing the rotation of the latter and the disengagement of the pawl 237b from the tooth of the second ratchet wheel 235 it is engaged with. Due to the force F acting on said first 234 and second 235 ratchet wheels by said selecting cable 23a, the second ratchet wheel 235 rotates until a tooth interferes with the lever 237a.

Releasing the cable 211a, the springs 2322 brings back the reducing slider 2321 in its initial position, the reducer pawl member 2324 disengages from the lever 237a of said unlocking pawl member 237 and then the pawl 237b of said unlocking pawl member 237 engages a following tooth of the second ratchet wheel 235, due to the action of the return spring 237c (FIG. 9C). In this position, the second ratchet wheel 235 is now rotated with respect to the original position, thus releasing the selecting cable 23a and reducing the gear of the gearshift 417.

Figure 10A:
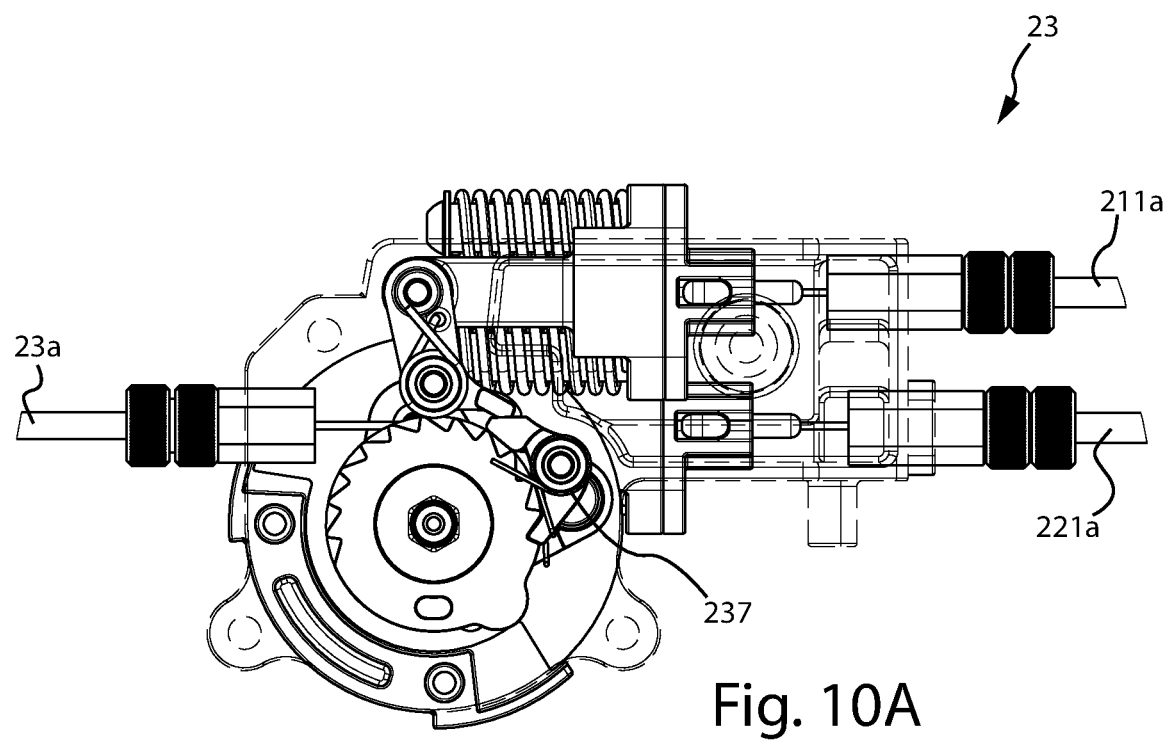
FIG. 10A shows a side view of the transmission ratio selecting device in an initial state, before increasing the gear.
Figure 10B:
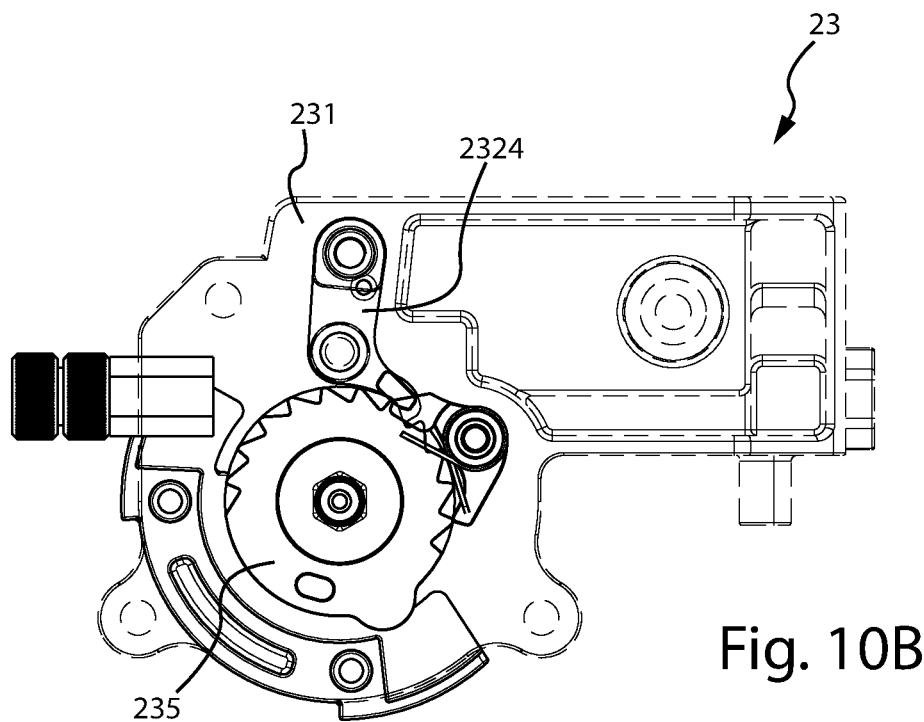
FIG. 10B shows a seethrough view of the transmission ratio selecting device in an intermediate state, while it is increasing the gear.
Figure 10C:
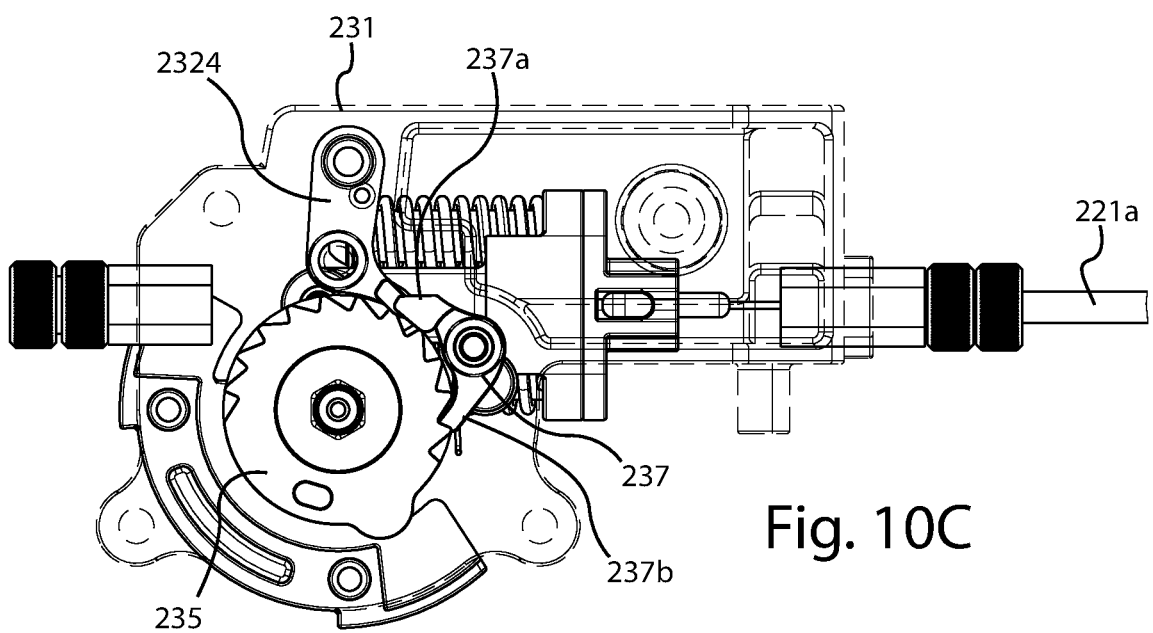
FIG. 10C shows a seethrough view of the transmission ratio selecting device in a final state, after the increasing of the gear.

Referring to FIGS. 10A to 10C, acting on the handle 21 is possible to increase the gear. In particular, when the cable 221a is pulled by said handle 22 (FIG. 10A), the increase slider 2331 is pulled in its turn, overcoming the resistance of the return springs 2332, thus causing the rotation of the rotating plate 2336 (FIG. 9B). This causes the lever 2334a of the increase pawl member 2334 to interfere with said cam shaped surface 2312 placed within the housing 2311, due to the rotation of the increase pawl member 2334, the pawl 2324b engages with a tooth of the first ratchet wheel 234, causing the rotation of the same toward the gear increase direction, thus pulling the selecting cable 23a. At the same time, the pawl 237b of said unlocking pawl member 237 slides on the second ratchet wheel 235, engaging with a subsequent tooth, so as to block any further rotation of said second ratchet wheel 235.

In one example implementation in accordance with aspects of the present invention, as shown, for example, in FIGS. 2, 3, 4, 5 or 6 and 7, the braking assembly 42 may comprise a second pulley 421 having a diameter greater than the first pulley 416, and a third pulley 422, which is keyed to the flywheel shaft 423.

The braking assembly 42 may also comprise a second force transmission portion 424. The second force transmission portion 424 may be a belt or chain, for example. Further, the second force transmission portion 424 may be engaged with the second pulley 421 and with the third pulley 422. Further, a belt tensioner 425 may be in contact with the second force transmission portion 424 to assist the engagement of the second force transmission portion 424 with the second pulley 421, and third pulley 422.

The braking assembly 42 may further comprise a flywheel 426, which may be keyed to, and removably connected to the flywheel shift 423.

Figure 11A:
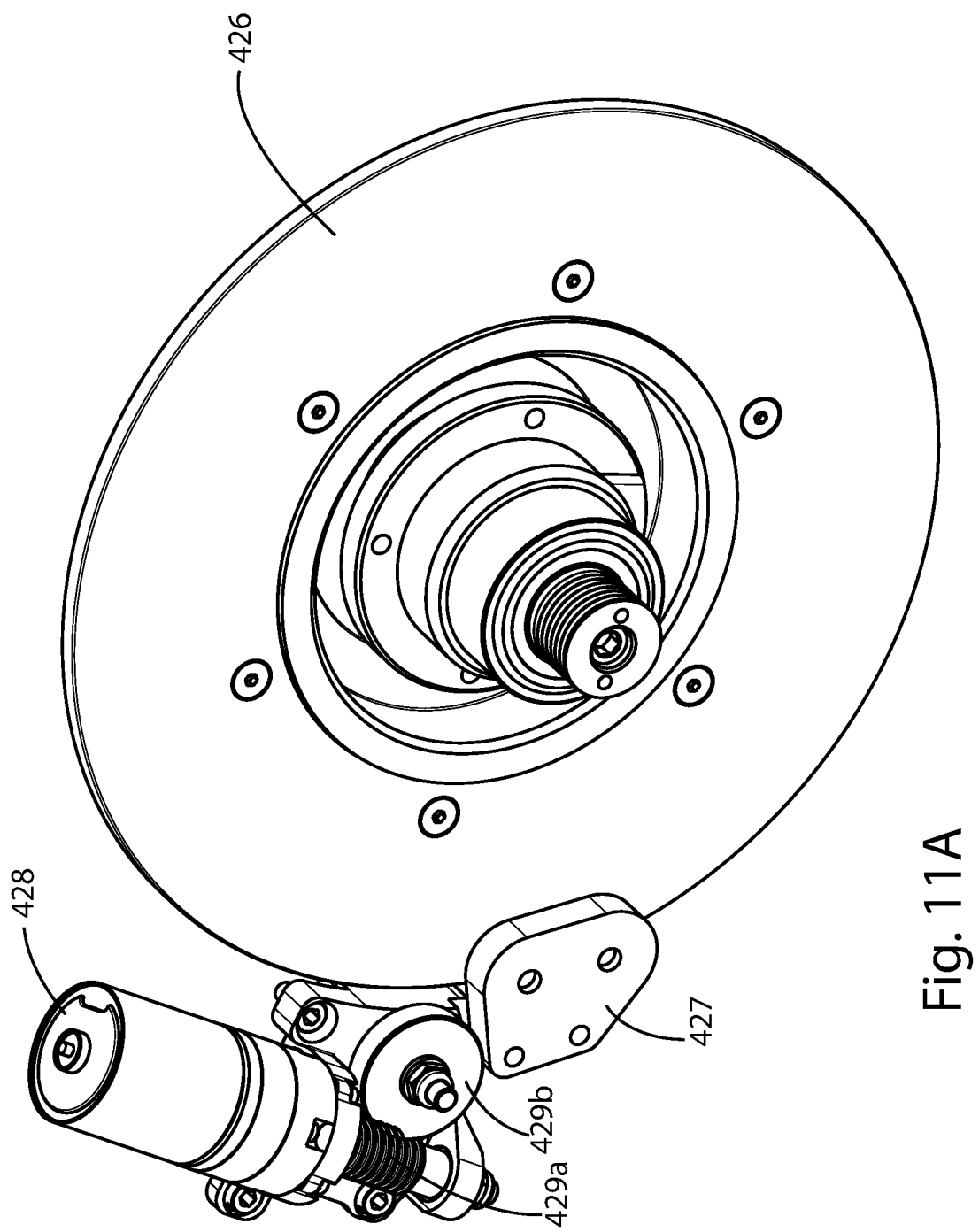
FIG. 11A shows details of a permanent magnet brake of the functional assembly of FIG. 2.
Figure 11B:
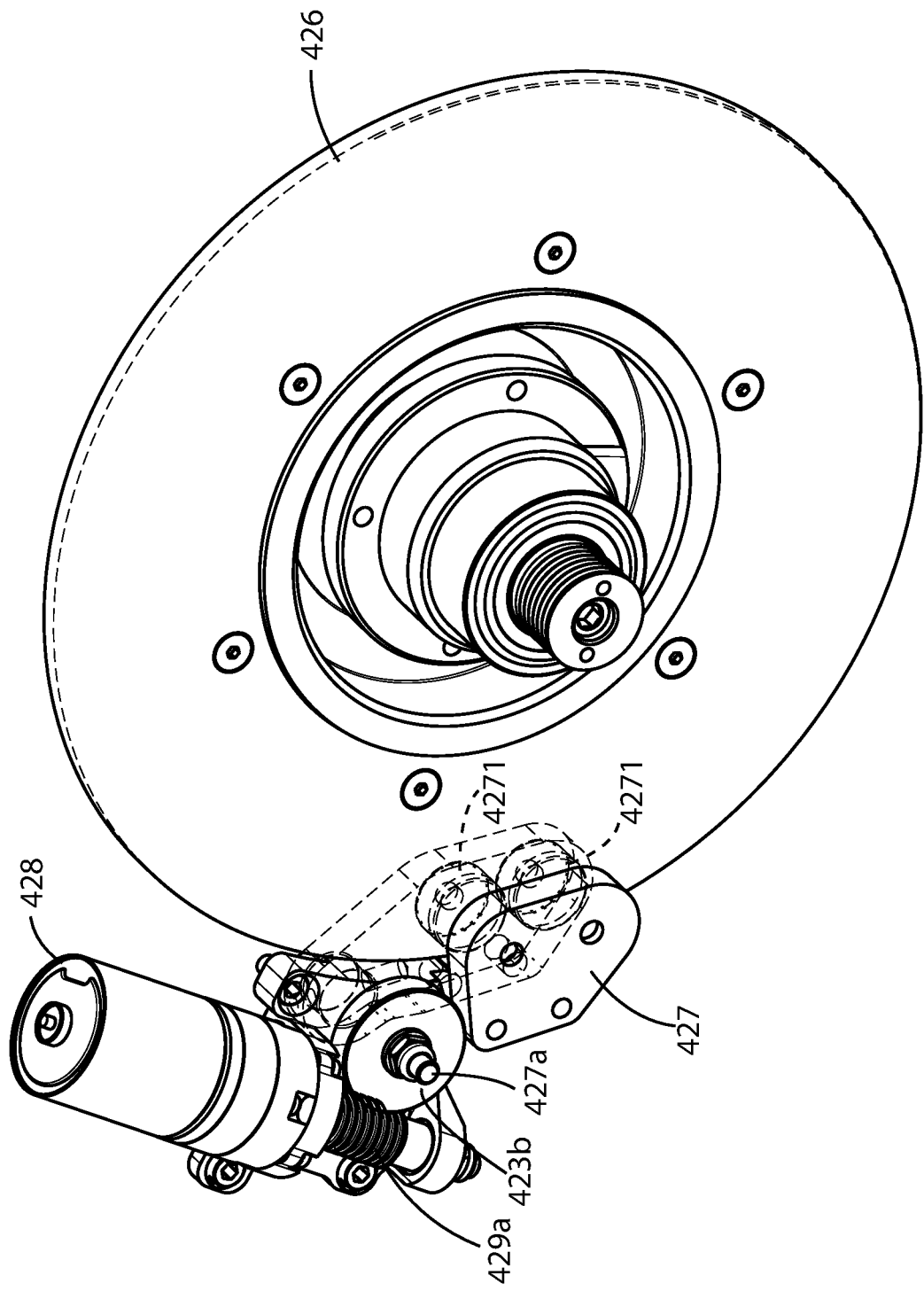
FIG. 11B shows a partially seethrough view of the permanent magnet brake of FIG. 11A.
Figure 11C:
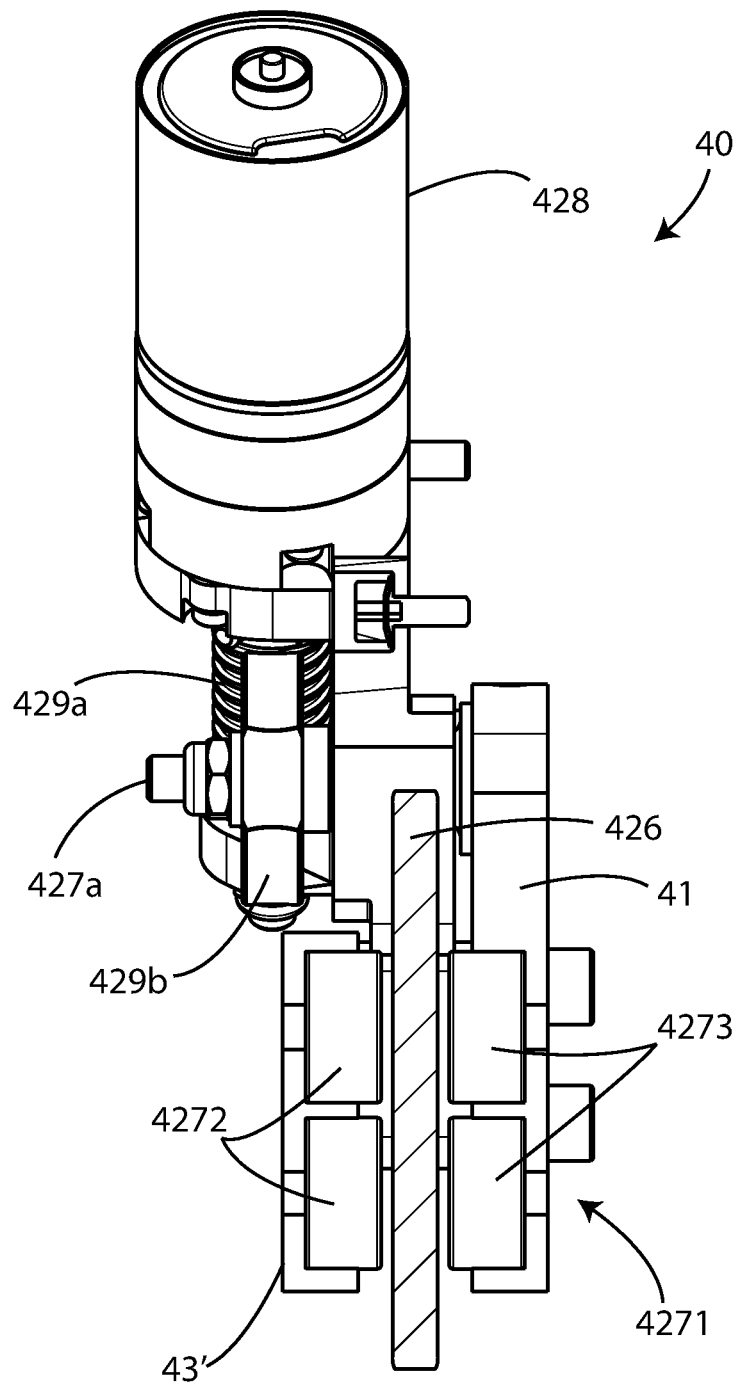
FIG. 11C shows a section view of the permanent magnet brake of FIG. 11A.

Referring also to FIGS. 11A-11C, details of the abovementioned braking assembly 42 are shown. In particular, a magnet holder bracket 427, pivoted about a pivot 427a, and first 4272 and a second 4273 pair of permanent magnets 4271, housed within said magnet holder bracket 427, so that each permanent magnet of said first 4272 pair of permanent magnets 4271 is faced to a respective permanent magnet of said second 4273 pair of permanent magnets 4271, in such a way that the flywheel 426 can pass between the magnets 4271 of said first 4272 and said second 4273 pair of permanent magnets.

Said magnet holder bracket 427 can assume an inactive position, in which the permanent magnets 4271 of said first 4272 and said second 4273 pairs of permanent magnets are not overlapped over the flywheel 426, and active positions, in which said permanent magnets 4271 of said first 4272 and said second 4273 pairs of permanent magnets are at least partially overlapped over said flywheel 426.

Said braking assembly 42 also comprises a motor 428, preferably an electric motor, arranged for rotating a worm screw 429a, and a nut screw 429b, engaged with said worm screw 429a. Said nut screw 429a being integral with, or fixed to said magnet holder bracket 427, in order to cause, when rotated, said magnet holder bracket 427 to pass from said inactive position to said active position.

When the control logic unit (CLU) 90 (again, refer to FIGS. 13 and 14) actuates the motor 428, the latter causes the rotation of the worm screw 429a according to a first rotation direction, so as to rotate the nut screw 429b.

Therefore, the magnet holder bracket 427 rotates about the pivot 427a, causing the increase of the overlapping surface of the permanent magnets 4271 of said first 4272 and said second 4273 pairs of permanent magnets over the flywheel 426. This increases the braking action on the (rotating) flywheel 426, due to the eddy currents induced therein. The flywheel 426 is made of an appropriate metal material.

When said motor 428 rotates in the worm screw 429a in a second direction, opposite to said first rotation direction, said nut screw 429b rotates said magnet holder bracket 427 from said active position to said inactive position.

Alternatively, the braking assembly 42 can comprise an electromagnetic type brake. In that case, the adjustment occurs by adjusting the current flowing through winding turns.

Figure 13:
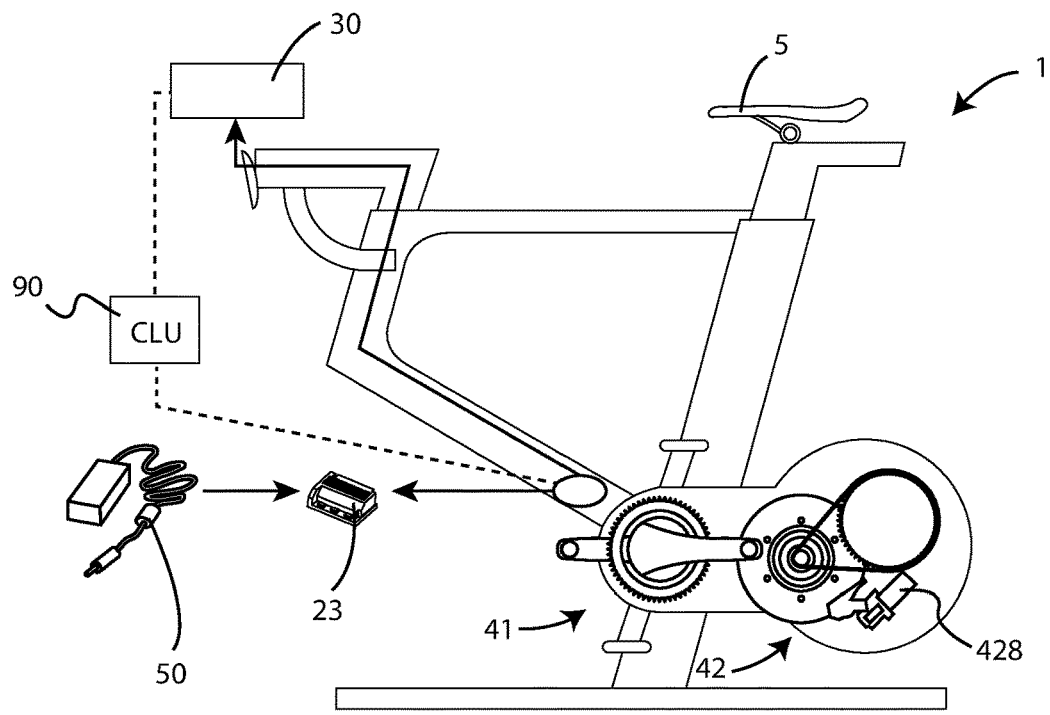
FIG. 13 shows a representative schematic side view of various features of an example gymnastic apparatus, including a power supply, in accordance with aspects of the present disclosure.
Figure 14:
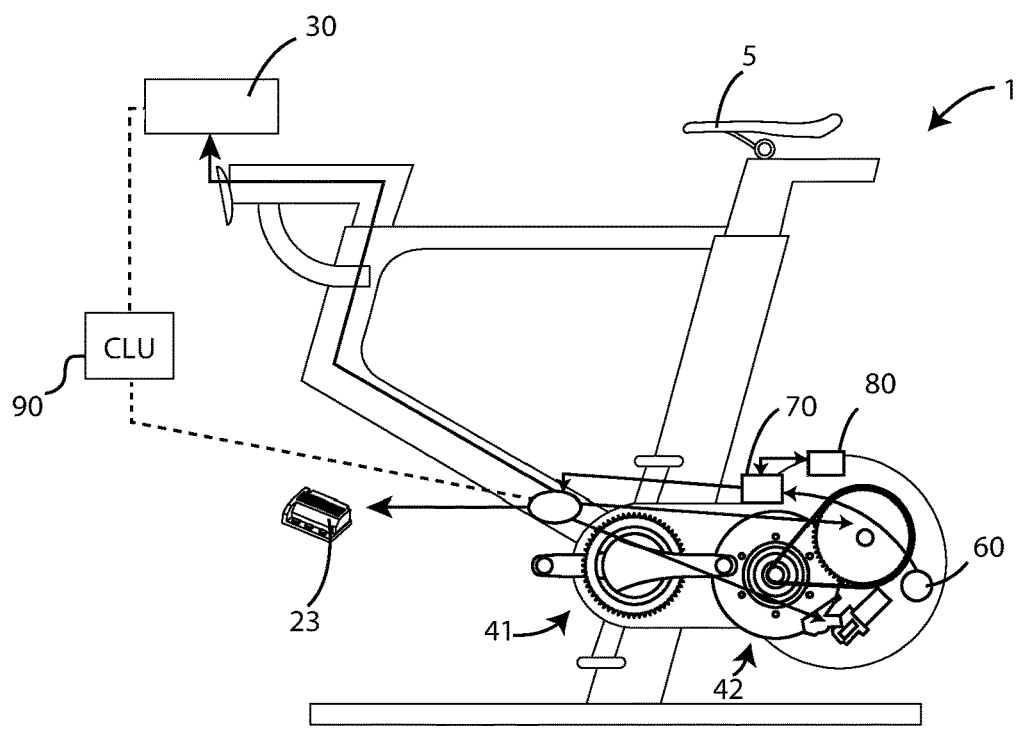
FIG. 14 shows a representative schematic side view of an example gymnastic apparatus, in which a power supply configuration is shown, in accordance with aspects of the present disclosure.

As shown in FIGS. 13 and 14, the interface device 30 may include, for example, a touch sensitive display, monitor, or the like, through which the user can set a training setting. The abovementioned interface may further show the characteristic parameters of a set training sequence or other training sequence as defined by, for example, user input.

Figure 4:
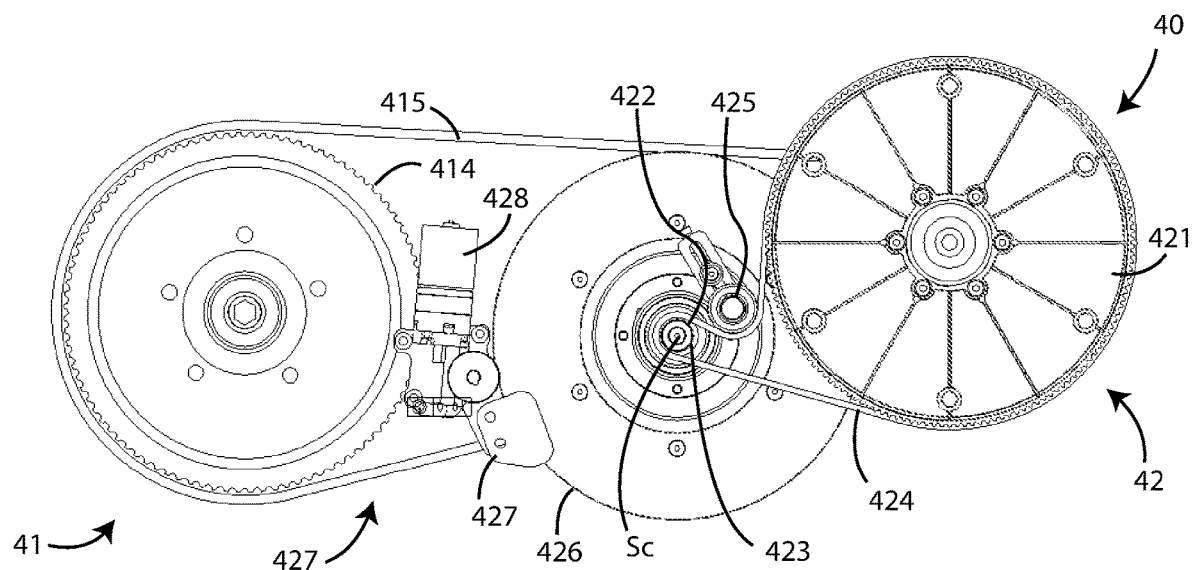
FIG. 4 shows a side view of the functional assembly of FIG. 2.
Figure 5:
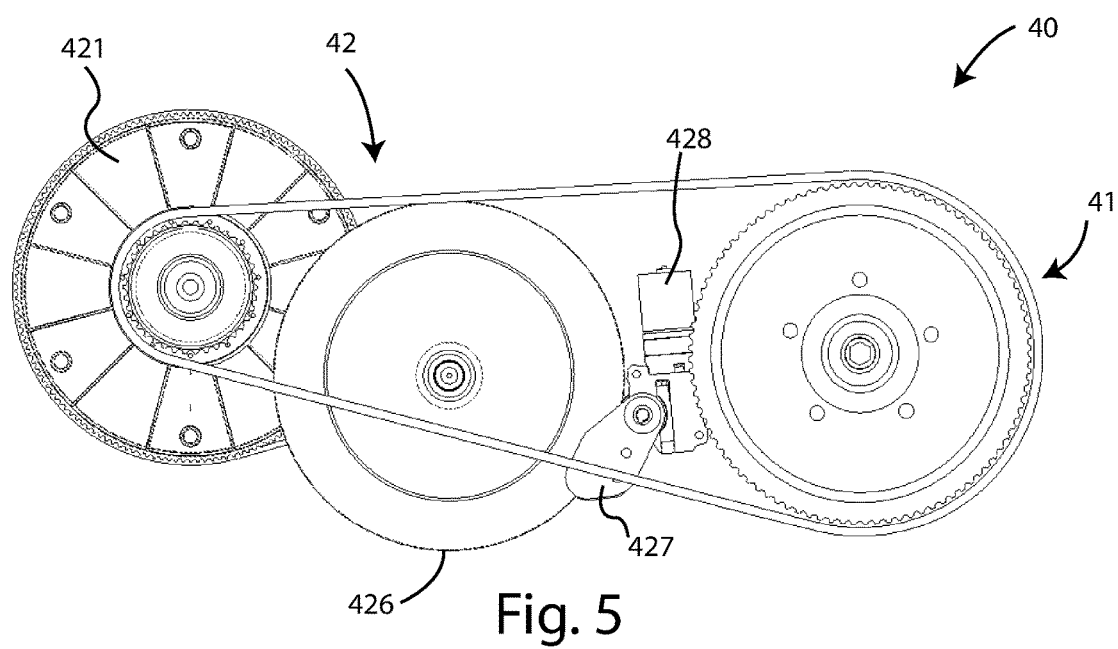
FIG. 5 shows a further side view of the functional assembly of FIG. 2.

The interface device 30 may comprise and/or be coupled with the control logic unit 90 for adjusting the motor 428 (FIG. 4). As said above and further shown in FIG. 4 and in FIGS. 11A-11C, the motor 428 may activate the magnet holder bracket 427. The magnet holder bracket 427 may act on the flywheel 426 based on a training setting or program selected by a user (e.g., the magnet holder bracket 427 may be selectively moved closer to or further from the flywheel 426, so as to selectively increase or decrease a braking effect on the flywheel 426, as described above).

The abovementioned training setting or program may comprise a simulated path or trail stored in the memory of the control logic unit 90 (see CLU 90, FIGS. 13 and 14). The simulated path or trail may be based on existing or known bike race courses or on known roads. The training setting or program may include a constant power training mode, and a slope training mode, for example.

In a constant power training mode, a user may set a fixed value of power P expressed in Watts, for example, which may be used by the CLU to control the braking power applied to the flywheel, so as to require the power P of the user's effort to maintain a speed of rotation of the flywheel 426. The user may also make manual changes to the abovementioned simulated paths or trails. For example, the abovementioned changes may include the setting of a variable power value, or by selecting one of a plurality of trainings modes stored in the memory of the control logic unit 90 based on power variations (e.g., corresponding to the trail going up or down hills). The user may also make manual changes to the set program, for example, by changing the target power or the required level of cadence.

In the slope training mode, the user may select one of the plurality of training programs stored in the memory of the CLU (see CLU 90, FIGS. 13 and 14). The abovementioned training program may be based on predetermined simulated path or trail. In the slope training mode a user may be able to make manual changes to the set simulated path or trail, for example by setting the slope of the simulated path or trail.

Figure 16:
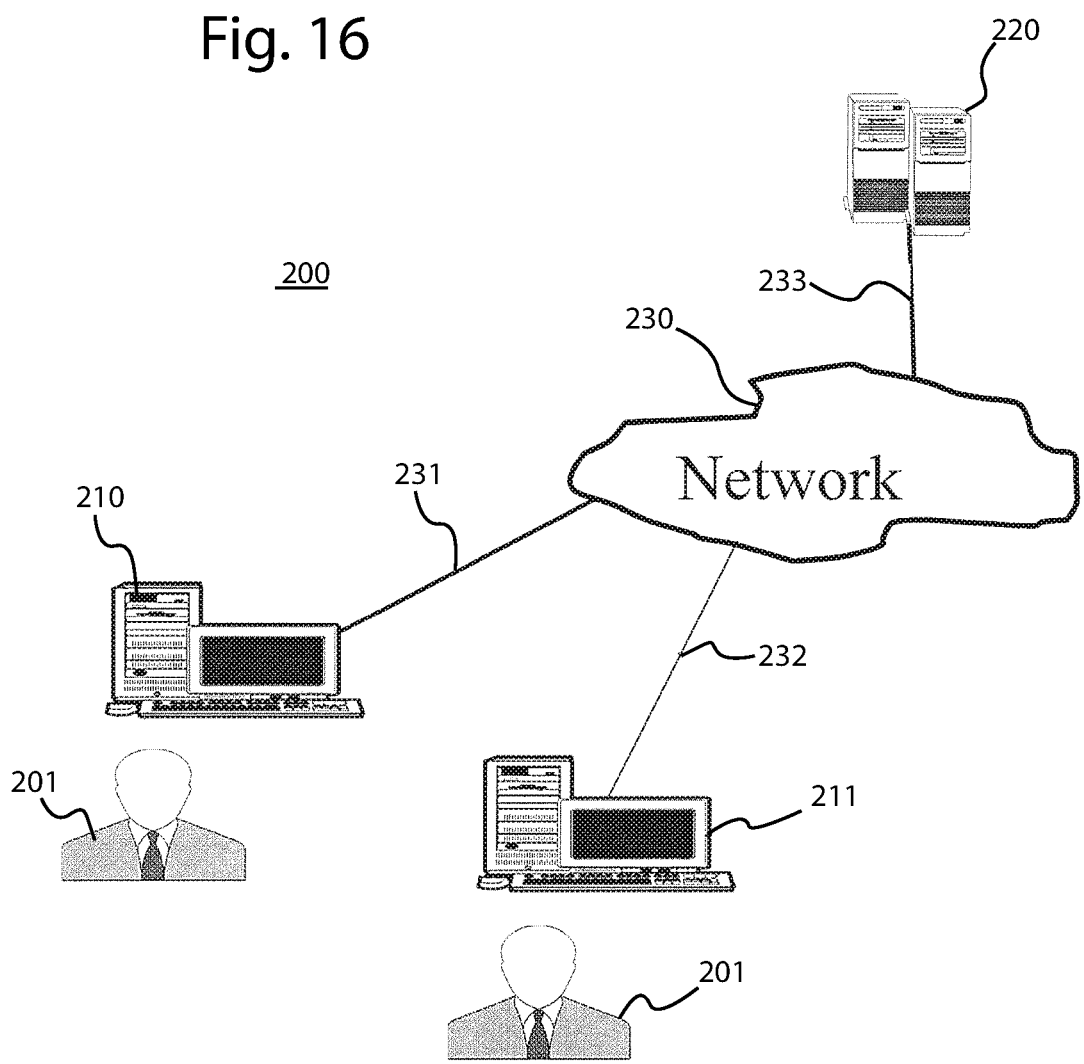
FIG. 16 is a block diagram of various example system components, for use in accordance with aspects of the present invention.

The operating method by which the gymnastic apparatus (1) for cycling simulation operates will be further described below referring to FIG. 16.

In another aspect, control of the gearshift 417, as shown in FIG. 2, in the transmission portion 40 may also be carried out electronically. The gymnastic apparatus 1 may comprise an actuator 24, coupled to the control logic unit (see the CLU 90, FIGS. 13 and 14), which may send a signal to an electronic shifting portion so as to cause the electronic shifting portion to act directly on the selecting cable 23a. The electronic shifting portion may comprise a servo, solenoid, or stepper motor, for example. The electronic shifting portion may act on the selecting cable 23a based on a signal received from the control logic unit (see the CLU 90, FIGS. 13 and 14). Said control logic unit may alter the signal sent to the electronic shifting portion according to the set training parameters. For example, the alteration may be to the torque values applied to the flywheel 426 (e.g., via the braking portion 427) and/or by signaling the user to alter the pedaling cadence (e.g., increased pedaling speed increasing the torque). As another example, the control logic unit (see CLU 90, FIGS. 13 and 14) may set a training program such that a user must maintain a pedaling cadence suitable for keeping a set power value, wherein the power value is based on a constant power value and known torque on the flywheel. In the abovementioned set training program, if a user applies a varying cadence to the pedals, the control logic unit (see CLU 90, FIGS. 13 and 14) may send a signal to activate the actuator 24, so as to pull the selecting cable 23a for altering the transmission ratio. In the abovementioned example the transmission ration may be changed, so that the user is able to maintain the appropriate cadence associated with the constant value of the set power.

Figure 12:
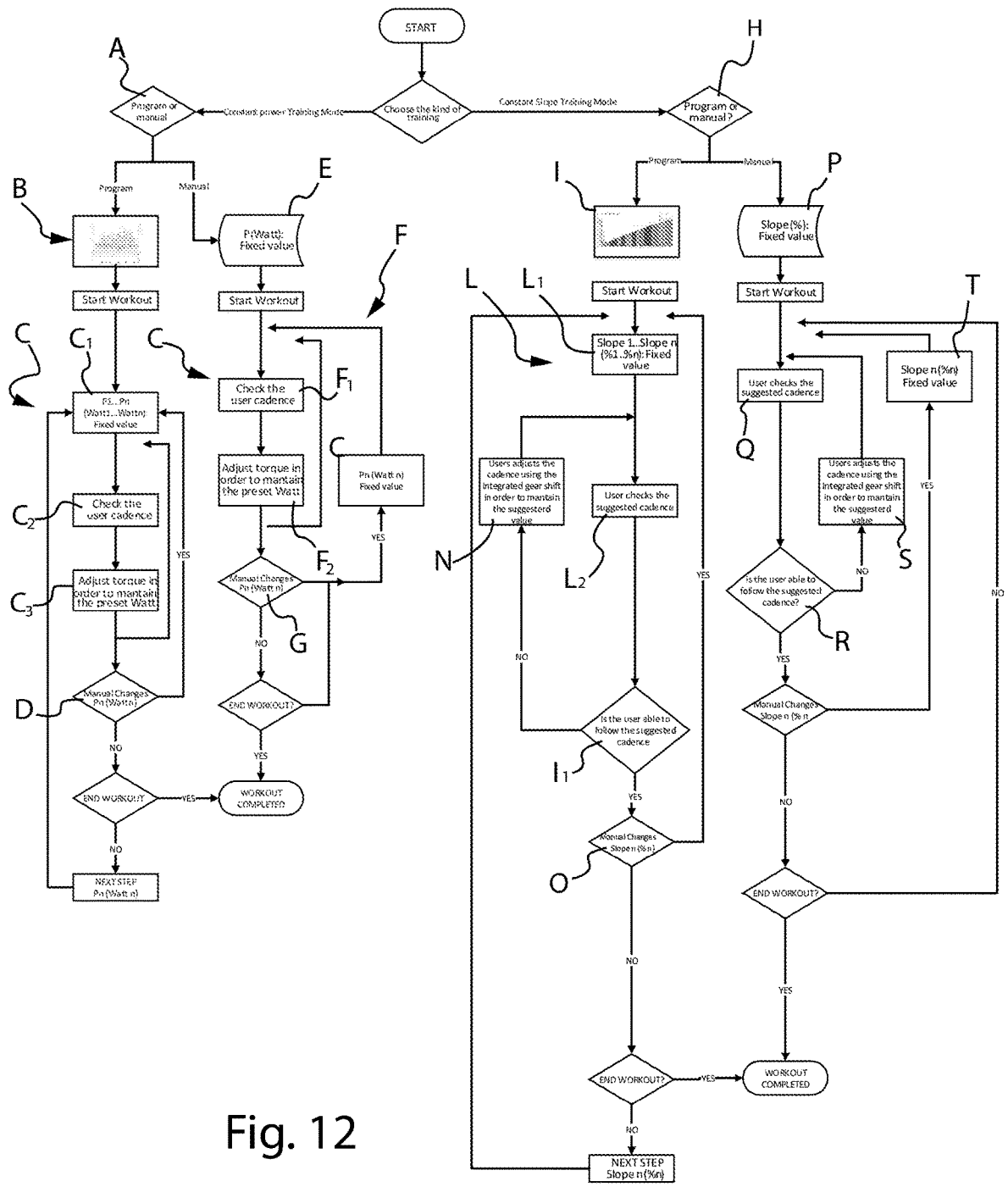
FIG. 12 shows a flowchart of the operating method of the gymnastic apparatus for cycling simulation in accordance with aspects of the present disclosure.
Figure 15:
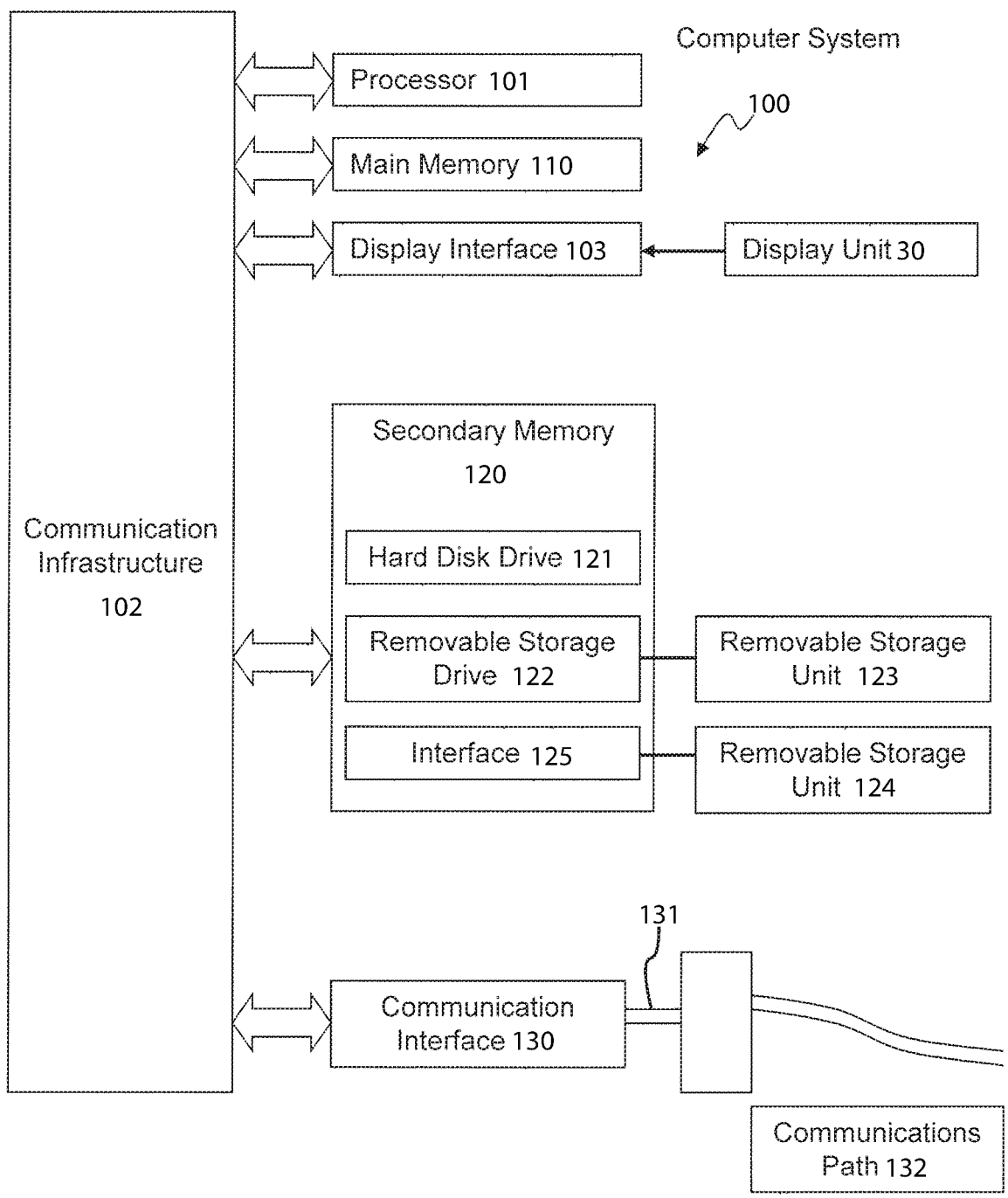
FIG. 15 contains a representative diagram of an example computer system capable of carrying out functionality described in example implementations in accordance with aspects of the present invention.

FIG. 12 shows a flowchart concerning the operating method of the gymnastic apparatus 1 for the cycling simulation, in accordance with aspects of the present disclosure, which can be implemented and run as said above by a control logic unit (see CLU 90, FIGS. 13 and 14) and particularly by a computer system (as the computer system 100 of FIG. 15).

As said operating method mainly provides two operating modes, which can be chosen by the user via said interface device 30: the constant power training mode or the constant slope training mode.

In the constant power training mode the user can decide whether to follow one of the programs stored in the control logic unit (see CLU 90, FIGS. 13 and 14) or to carry out manually the workout.

The constant power training mode comprises a main selecting step (A), where the user selects by the interface device 30 whether to carry out the workout following one of the available programs or to carry out a workout selecting manually one of the levels of power $P_1 \ldots P_n$, namely the parameter of the power of the workout; and a program selecting step (B), in case of the user in said step (A) selected to carry out the workout following one of the available programs, where the user selects the workout program among the ones available.

The constant power training mode also comprises a workout control procedure (C), comprising the substeps of (C1) running the level of power $P_i$ among the possible set of levels of power $P_1 \ldots P_n$ selectable, a checking the cadence of the user step (C2), carried out by means of said sensor Sc, adjusting the torque (C3), in order to maintain the present power value $P_i$.

The constant power training mode comprises a manual level of power change step (D), where the user can change the level of power $P_i$ of the workout among the possible set of levels of power $P_1 \ldots P_n$, such that, in case of the level of power $P_i$ is changed, the procedure comes back to the workout control procedure (C), otherwise the workout ends; a level of power selecting step (E), in case of the user in said step (A) selected to carry out to the workout selecting the level of power $P_i$; and a workout control procedure (F), comprising the substeps of (F1) checking the cadence of the user, carried out by means of said sensor Sc; (F2) adjusting the torque in order to maintain the present power value $P_i$; (G) a manual level of power change, where the user can change the level of power Pi of the workout among the possible set of levels of power $P_1 \ldots P_n$, such that, in case of the level of power $P_i$ is changed, the procedure comes back to the workout control procedure (C), otherwise the workout ends.

In the constant slope training mode the user can decide whether to follow one of the programs stored in the control logic unit (see CLU 90, FIGS. 13 and 14) or to carry out manually the workout.

The constant slope training mode comprises a main selecting step (H), where the user selects by the interface device 30 whether to carry out the workout following one of the available programs by the interface device 30 or to carry out a workout selecting manually one of the slopes Slope_1; . . . ; Slope_n, namely the slope to be simulated by the workout; and a program selecting step (I), in case of the user in said main selecting step (H) selected to carry out the workout following one of the available programs, where the user selects the workout program among the ones available.

The constant slope training mode comprises a workout control procedure (L), comprising the substeps of (L1) running the slope Slope_i among the possible set of levels of power Slope_1; . . . ; Slope_n selectable; (L2) checking the cadence of the user; a checking step (M), where it is checked whether the user is able to carry out the suggested cadence, so that, in case of the user is not able to carry out the suggested cadence, said constant slope training mode comprises an adjustments step (N) of the cadence by the integrated gearshift 417; otherwise a manual level of slope value change step (O) is provided, where the user can change the level of the slope Slope_i of the workout among the possible set of slope levels Slope_1; . . . ; Slope_n, coming back to said workout control procedure (L).

The constant slope training mode comprises also a level of slope selecting step (P), in case of the user in said main selecting step (H) selected to carry out to the workout selecting the level of slope Slope_i; a workout control procedure (Q), comprising the step checking the cadence of the user, carried out by means of said sensor Sc; a checking step (R), where it is checked whether the user is able to carry out the suggested cadence, so that, in case of the user is not able to carry out the suggested cadence, said constant slope training mode comprises an adjustments step (S) of the cadence by the integrated gearshift 417; a slope level manual change step (T), where the user can change the slope level Slope_i of the workout among the possible set of slope levels Slope_1; . . . ; Slope_n, such that, in case of the selected slope Slope_i is changed, the procedure comes back to the workout control procedure (Q), otherwise the workout ends.

Referring now to FIG. 13, the gymnastic apparatus 1 may be powered by a connection 50 to a common electrical main or other power source, for example. Alternatively, the apparatus 1 may be powered by an internal power source, such as a battery. The connection may provide power to the motor 427b and/or the interface device 30, among other components.

Referring now to FIG. 14, the gymnastic apparatus 1 may also be self-powered or recharged (e.g., if powered by an internal rechargeable battery) via a generator 60, which feeds a converter 70, for example. The generator 60 and converter 70 may exchange energy with a battery for supplying power to the motor 427b and/or the interface device 30, among other components.

The gymnastic apparatus 1 described above may further operate as follows. When a user wishes to train on the gymnastic apparatus 1, the user may interact with the interface device 30, so as to set the type of training among any number of programs that may be stored in a memory. During the operation of the gymnastic apparatus 1, the display may show a user's cadence, among other information, which may allow a user to follow the set training program. The inertia felt by a user when applying a force to the pedals may be dependent on the resistance variations of the flywheel 426, which may be controlled using any one of the methods and features described above. Accordingly, the resistance variations of the flywheel 426 may be controlled based on the training program set by a user. For example, in a constant power training mode, the display may convey that a user must perform the training keeping a constant set power value.

The power value P (to be maintained so as to correspond to the set power value) exerted by the user may be calculated using a detected torque, and/or resistance exerted by the brake of the flywheel 426, and/or the rotation speed of the flywheel shaft 423, and/or a pedaling cadence.

Based on the pedaling cadence, the control logic unit (see CLU 90, FIGS. 13 and 14) may adjust the braking force acting on the flywheel 426. For example, during the rotation of the flywheel shaft 423, the torque sensor $S_c$ may periodically detect the torque acting on the flywheel shaft 423 and transmit the data to the CLU (see CLU 90, FIGS. 13 and 14). As data are received, the CLU (see CLU 90, FIGS. 13 and 14) may send a signal to activate the motor 274b, which may vary the intensity of the braking force exerted by the permanent magnet brake 427 of the flywheel 426, as appropriate for the program of exercise selected, thus achieving feedback control.

In a slope training mode, for example, as described above, the user may select, through the interface device 30, a training based on a predetermined simulated path or trail stored in the memory. The control logic unit (see CLU 90, FIGS. 13 and 14) may compute a torque to be applied to the flywheel 426 based on the simulated path or trail selected by a user, and a transmission ratio set by the user, such as via the first lever 211 and/or second lever 221. For example, if the path or trail selected by the user provides a low slope portion, the control logic unit (see CLU 90, FIGS. 13 and 14) may convey at least the slope information to the user through the interface device 30. The control logic unit (see CLU 90, FIGS. 13 and 14) may contemporaneously determine that the simulated slope requires an increased resistance value, and the control logic unit may output a signal to increase the resistance value on the flywheel 426 by activating the motor 427b. The motor 427b may apply a force to the magnet holder bracket 427a and thereby impart a resistance to be transmitted via the flywheel 426, for example. In the abovementioned example simulation, a user may be led to pedal at a higher speed, at which point the user may determine that the pedal cadence is high. A user may change the transmission ratio by acting on the first lever 211 and/or second lever 221 to cause a decrease in the abovementioned cadence.

As another example, if the path or trail selected by the user provides a high downward slope portion, the control logic unit (see CLU 90, FIGS. 13 and 14) may convey at least the slope information to the user through the interface device 30.

The control logic unit (see CLU 90, FIGS. 13 and 14) may contemporaneously determine that the simulated slope requires a decrease in the resistance of the flywheel 426, and a corresponding output signal is therefore generated. The resistance may thereby be decreased as appropriate by operating the motor 427b to move the magnet holder via the bracket 427an away from the flywheel 426.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 100 is shown in FIG. 14.

Computer system 100 includes one or more processors, such as the processor 101. The processor 101 is coupled to a communication infrastructure 102 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 100 may include a display interface 30 that forwards graphics, text, and other data from the communication infrastructure 102 (or from a frame buffer not shown) for display on said display interface 30, connected to the communication infrastructure 102 through a display interface 103. Computer system 100 may include a main memory 110, preferably random access memory (RAM), and may also include a secondary memory 120. The secondary memory 120 may include, for example, a hard disk drive 121 and/or a removable storage drive 122, representing a floppy disk drive, a magnetic tape drive, an optical disk drive, etc. The removable storage drive 122 may read from and/or write to a removable storage unit 123 in a well-known manner. Removable storage unit 123, represents a floppy disk, magnetic tape, optical disk, etc., which may be read by and written to a further removable storage unit 124, connected to an interface 125. As will be appreciated, the removable storage unit 123 may include a computer usable storage medium having stored therein computer software and/or data.

As mentioned above, alternative aspects of the present invention may include said secondary memory 120 and other similar devices for allowing computer programs or other instructions to be loaded into computer system 100. Such devices, as said, may include, for example, said removable storage unit 124 and the relevant interface 125. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 125, which allow software and data to be transferred from the removable storage unit 124 to computer system 100.

Computer system 100 may also include a communications interface 130. Communications interface 130 may allow software and data to be transferred among computer system 100 and external devices. Examples of communications interface 130 may include a modem, a network interface (such as an Ethernet card), a communications port, a Personal Computer Memory Card International Association (PCMCIA) slot and card, etc. Software and data transferred via communications interface 130 may be in the form of signals 131, which may be electronic, electromagnetic, optical or other signals capable of being received by communications interface 130. These signals 131 may be provided to communications interface 824 via a communications path (e.g., channel) 132. This path 132 may carry signals 131 and may be implemented using wire or cable, fiber optics, a telephone line, a cellular link, a radio frequency (RF) link and/or other communications channels. As used herein, the terms "computer program medium" and "computer usable medium" refer generally to media such as a removable storage drive 122, a hard disk installed in hard disk drive 121, and/or signals 131. These computer program products may provide software to the computer system 100. Aspects of the present invention are directed to such computer program products.

Computer programs (also referred to as the control logic unit, CLU; see CLU 90, FIGS. 13 and 14) may be stored in main memory 110 and/or secondary memory 120. Computer programs may also be received via communications interface 130. Such computer programs, when executed, may enable the computer system 100 to perform the features in accordance with aspects of the present invention, as discussed herein. In particular, the computer programs, when executed, may enable the processor 101 to perform the features in accordance with aspects of the present invention. Accordingly, such computer programs may represent controllers of the computer system 100.

Where aspects of the present invention may be implemented using software, the software may be stored in a computer program product and loaded into computer system 100 using removable storage drive 122, hard drive 121, or communications interface 125. The control logic (software), when executed by the processor 101, may cause the processor 101 to perform the functions described herein. In another aspect of the present invention, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present invention may be implemented using a combination of both hardware and software.

FIG. 15 is a block diagram of various example system components, for use in accordance with aspects of the present invention. FIG. 15 shows an example communication system 200 usable in accordance with aspects of the present invention. The communication system 200 may include one or more accessors 201, 202 (also referred to interchangeably herein as one or more "users") and one or more terminals 210, 211, such as the computer systems 100 shown and described with respect to FIG. 15 and/or the CLU 90 shown and described with respect to FIGS. 13 and 14. In one aspect, data for use in accordance with aspects of the present invention May be, for example, input and/or accessed by accessors 201, 202 via terminals 210, 211, such as a computer system 100 (FIG. 15) or CLU 90 (FIGS. 13 and 14), which may comprise or include components of personal computers (PCs), minicomputers, mainframe computers, microcomputers, telephonic devices, or wireless devices, such as personal digital assistants ("PDAs"), smart phones, or other hand-held wireless devices coupled to a server 220, such as a PC, minicomputer, mainframe computer, microcomputer, or other device having a processor and a repository for data and/or connection to a repository for data, via, for example, a network 230, such as the Internet or an intranet, and couplings 231, 232, 233. The couplings 231, 232, 233 include, for example, wired, wireless, or fiberoptic links. In another variation, the method and system in accordance with aspects of the present invention operate in a stand-alone environment, such as on a single terminal.

As it is apparent from the above description, the cycling simulation gymnastic apparatus of the present invention allows to perform life-like cycle training.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

The invention claimed is:

1. An apparatus for cycling simulation comprising:
a support frame;
a handlebar fixed to said support frame of the apparatus, comprising a first handle and a second handle arranged thereon, and a first lever, fixed on said first handle and connected to a first cable, and a second lever fixed on said second handle and connected to a second cable, said first and second lever being pivotally operable;
a transmission portion rotatably driven by pedals and installed on said support frame, the transmission portion comprising:
a transmission assembly, for the transmission of a motion from said pedals;
a gearshift that is mechanically coupled to the transmission assembly and is configured to mechanically select a gear ratio in the transmission assembly;
a transmission ratio selecting device mechanically coupled with said gearshift, the first cable extending from said first lever to said transmission ratio selecting device, for operating said gearshift and the second cable extending from said second lever to said transmission ratio selecting device, for operating said gearshift; and
a braking assembly, comprising a flywheel, rotating about a flywheel shaft operated by said transmission assembly, said braking assembly being arranged for braking said flywheel;
said apparatus further comprising:
a control logic unit, wherein cycling training parameters are stored or are settable by a user; and
a sensor connected to said control logic unit, said sensor being capable of detecting a feedback signal related to a torque acting on said flywheel shaft during the rotation of said flywheel and of sending said signal to said control logic unit;
said control logic unit being configured to adjust a braking force exerted by said braking assembly on said flywheel by adjusting a resistance to the rotation of said transmission portion when a force is applied to said pedals based on said parameters and on the feedback signal received from said sensor.

2. The apparatus according to claim 1, wherein said gearshift comprises gear wheels, coupled to each other by epicyclical gearing.

3. The apparatus according to claim 1, wherein said transmission assembly comprises
a main shaft,
cranks to which said pedals are coupled, said cranks being coupled with said main shaft,
a crown keyed on said main shaft,
a first pulley,
a secondary shaft, to which said first pulley is keyed, and
a first force transmitting portion engaged with said crown and with said first pulley.

4. The apparatus according to claim 3, wherein said gearshift for the selection of a gear ratio is mechanically coupled with said secondary shaft.

5. The apparatus according to claim 1, wherein said transmission ratio selecting device is connected to said gearshift by a selecting cable, said transmission ratio selecting device comprises:
- a gear reducer assembly mechanically connected to said selecting cable;
- a gear increase assembly mechanically connected to said selecting cable; and
- a snap operable mechanism, which said selecting cable is coupled to, said snap operable mechanism being operable by said gear reducer assembly and said gear increase assembly, such that:
- when said first lever is operated and said first cable is pulled, said gear reducer assembly operates said snap operable mechanism, so as to release said selecting cable of a stretch; and
- when said second lever first lever is operated and said second cable is pulled, said gear increase assembly operates said snap operable mechanism, so as to pull said selecting cable of a stretch.

6. The apparatus according to claim 5, wherein said snap operable mechanism comprises a first and a second ratchet wheels keyed each other, one end of said selecting cable being fixed to said first and a second ratchet wheels, said first and second ratchet wheels being arranged so as to rotate in a gear reducing direction, in which the selecting cable is released, and in a gear increase direction, opposite to said gear reducing direction, in which the selecting cable is pulled; and
- an unlocking pawl member, having a lever and a pawl, said pawl of said unlocking pawl member being kept engaged with a tooth of the second ratchet wheel by a spring; and
in that said transmission ratio selecting device comprises:
- a containment casing having a housing within which first and a second ratchet wheels are arranged and where a cam shaped surface is obtained, said unlocking pawl member being pivoted about said containment casing;
- said gear reducer assembly comprises a reducing slider, provided with return springs and a reducer pawl member, operable by said reducing slider and having a pawl arranged so as to engage, when operated, said lever of said unlocking pawl member, said reducer pawl member being pivoted about said containment casing, fixed to said containment casing and provided with a return spring, for returning said reducer pawl member in an initial position, after the operation by said reducing slider; and
- said gear increase assembly comprising a rotating plate, pivoted about said containment casing, an increase slider, provided with return springs and said increase slider being also rotatably coupled with said rotating plate in a point placed eccentric with respect to the pivot said rotating plate is pivoted about with respect to said containment casing, and an increase pawl member, pivoted about said rotating plate and provided with a return spring, said increase pawl member having a lever and a pawl and being arranged for engaging a tooth of said first ratchet wheel, so as to rotate the same toward said gear increase direction, so as to cause the pawl of said unlocking pawl member to slide over the second ratchet wheel and engage with a following tooth.

7. The apparatus according to claim 1, further comprising an actuator, for electronic activation of said gearshift, said actuator being connected to, and operated by said control logic unit.

8. The apparatus according to claim 7, wherein said actuator operates said transmission ratio selecting device.

9. The apparatus according to claim 1, wherein said braking assembly comprises
- at least one permanent magnet,
- a magnet holder bracket housing said at least one permanent magnet, said magnet holder bracket being capable of assuming an inactive position, in which said at least one permanent magnet does not overlap over said flywheel, and an active position, in which said at least one permanent magnet is at least partially overlapped over said flywheel, and
- a motor, connected to, and controlled by said control logic unit, said motor being arranged for causing said magnet holder bracket to pass from said inactive position to an active position and vice-versa.

10. The apparatus according to claim 1, wherein said braking assembly is of electromagnetic type comprising a coil and a clutch, actuated by said coil made of winding turns, where the adjustment of a braking action is achieved by adjusting a current flowing through said winding turns.

11. The apparatus according to claim 1, wherein said sensor is a torque sensor for detecting the torque acting on said flywheel shaft during the rotation of said flywheel, and further may detect at least one of a rotation speed of said flywheel or the pedaling cadence of said user by means of said pedals.

12. The apparatus according to claim 1, wherein said cycling training parameters comprises a power of a workout or a slope to be simulated by the workout.

13. An operating method for a cycling simulation apparatus according to claim 1, comprising a constant power training mode and a constant slope training mode.

14. The method according to claim 13, wherein the constant power training mode comprises:
- a main selecting step whereby an interface device is used to select whether to carry out a workout via a program or to carry out a workout by manually selecting one of a plurality of power levels;
- a program selecting step, for selecting one of a plurality of available programs if a program is selected in the main selecting step;
- a workout control procedure, comprising substeps of running a power level of the based on the selected power level; checking a cadence via the sensor and showing the cadence to the user; and adjusting the torque in order to maintain the selected power level of the workout;
- a power level selecting step for selecting a power level of workout if a user manually selects on of the plurality of power levels; and
- a workout control procedure step, comprising the substeps of checking the cadence via the sensor and showing the cadence to the user; and adjusting the torque in order to maintain a present power value.

15. The method according to claim 14, wherein after said control procedure step the user can change the power level of the workout from amongst a possible set of power levels of the workout, wherein if the power level of the workout is changed, the procedure repeats the workout control procedure, otherwise the workout ends; or
- after said workout control procedure step, a manual level of power level of the workout change step is provided, wherein the user can change the power level of the workout from among the possible set of power levels of the workout, wherein if the power level of the workout is changed, the procedure returns back to the workout control procedure, otherwise the workout ends.

16. The method according to claim 13, wherein the constant slope training mode comprises:
- selecting via an interface device whether to carry out a workout following one of available programs or to carry out a workout by manually selecting a simulating slope value; and
- wherein the available programs comprise a program selecting step;
- a workout control procedure, comprising substeps of running a simulated slope value among a possible set of levels of selectable simulating slope values; checking a cadence via the sensor, and showing it to the user;
- a checking step, wherein it is determined if a user is able to maintain a suggested cadence, and if the user is not able to maintain the suggested cadence, said constant slope training mode comprises an adjustment step for adjusting the cadence via said gearshift;
- if the user is able to maintain the suggested cadence, a slope level manual change option is provided, allowing the user to change the slope level of the from a set of slope levels;
- a level of slope selecting step for carrying out a workout selected slope level.

17. The apparatus according to claim 1, wherein pivotal operation of the first handle transmits a first handle force to the transmission ratio selection device via the first cable, and pivotal operation of the second handle transmits a second handle force to the transmission ratio selection device via the second cable.

18. The apparatus according to claim 17, wherein the ratio selection device is configured to transmit a ratio selecting device force to the gearshift in response to the ratio selection device receiving at least one of the first handle force or the second handle force.

19. The apparatus according to claim 17, wherein the ratio selecting device force is transmitted from the ratio selecting device to the gearshift via a selecting cable.

* * * * *